(12) United States Patent  (10) Patent No.: US 11,348,582 B2
Lindahl  (45) Date of Patent: May 31, 2022

(54) ELECTRONIC DEVICES WITH VOICE COMMAND AND CONTEXTUAL DATA PROCESSING CAPABILITIES

(71) Applicant: Apple Inc., Cupertino, CA (US)

(72) Inventor: Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 16/836,226

(22) Filed: Mar. 31, 2020

(65) Prior Publication Data

US 2020/0227044 A1 Jul. 16, 2020

Related U.S. Application Data

(63) Continuation of application No. 15/938,603, filed on Mar. 28, 2018, now Pat. No. 10,643,611, which is a (Continued)

(51) Int. Cl.
*G10L 15/22* (2006.01)
*G06F 16/43* (2019.01)
(Continued)

(52) U.S. Cl.
CPC .............. *G10L 15/22* (2013.01); *G06F 3/167* (2013.01); *G06F 16/43* (2019.01);
(Continued)

(58) Field of Classification Search
CPC ....... G10L 15/26; G10L 15/30; G10L 15/063; G10L 15/07; G10L 15/18; G10L 15/1815;
(Continued)

(56) References Cited

U.S. PATENT DOCUMENTS 3,704,345 A 11/1972 Coker et al.
3,787,542 A 1/1974 Gallagher et al.
(Continued)

FOREIGN PATENT DOCUMENTS

AU 2014100581 B4 9/2014
AU 2015203483 A1 7/2015
(Continued)

OTHER PUBLICATIONS

AAAAPLAY, "Sony Media Remote for iOS and Android", Online available at: <https://www.youtube.com/watch?v=W8QoeQhlGok>, Feb. 4, 2012, 3 pages.
(Continued)

*Primary Examiner* — Vijay B Chawan
(74) *Attorney, Agent, or Firm* — Dentons US LLP

(57) ABSTRACT

An electronic device may capture a voice command from a user. The electronic device may store contextual information about the state of the electronic device when the voice command is received. The electronic device may transmit the voice command and the contextual information to computing equipment such as a desktop computer or a remote server. The computing equipment may perform a speech recognition operation on the voice command and may process the contextual information. The computing equipment may respond to the voice command. The computing equipment may also transmit information to the electronic device that allows the electronic device to respond to the voice command.

27 Claims, 7 Drawing Sheets

Related U.S. Application Data continuation of application No. 15/207,248, filed on Jul. 11, 2016, now Pat. No. 9,959,867, which is a continuation of application No. 14/165,520, filed on Jan. 27, 2014, now Pat. No. 9,412,392, which is a continuation of application No. 12/244,713, filed on Oct. 2, 2008, now Pat. No. 8,676,904.

(51) Int. Cl.
  *G10L 15/30* (2013.01)
  *G06F 3/16* (2006.01)
  *G10L 21/06* (2013.01)
  *G10L 15/18* (2013.01)

(52) U.S. Cl.
  CPC .......... *G10L 15/1822* (2013.01); *G10L 15/30* (2013.01); *G10L 21/06* (2013.01); *G10L 2015/223* (2013.01); *G10L 2015/228* (2013.01)

(58) Field of Classification Search
  CPC ....... G10L 15/22; G10L 15/285; G10L 15/32; G10L 17/00; G10L 15/1822; G10L 2015/223; G10L 2015/228; G06F 16/43; G06F 3/167
  USPC ............. 704/244, 270, 275, 231, 246, 270.1
  See application file for complete search history.

(56) References Cited

U.S. PATENT DOCUMENTS

| | | |
|---|---|---|
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,163,809 A | 11/1992 | Akgun et al. |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,255,386 A | 10/1993 | Prager |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,305,421 A | 4/1994 | Li et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh et al. |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |

(56) References Cited

U.S. PATENT DOCUMENTS

| | | |
|---|---|---|
| 5,581,655 A | 12/1996 | Cohen et al. |
| 5,584,024 A | 12/1996 | Shwartz |
| 5,586,540 A | 12/1996 | Marzec et al. |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,664,206 A | 9/1997 | Murow et al. |
| 5,675,819 A | 10/1997 | Schuetze |
| 5,678,039 A | 10/1997 | Hinks et al. |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,873,064 A | 2/1999 | De Armas et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,017,219 A | 1/2000 | Adams, Jr. et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,951 A | 5/2000 | Park et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,885 A | 6/2000 | Beutnagel |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,092,036 A | 7/2000 | Hamann et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,199,076 B1 | 3/2001 | Logan et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,324,499 B1 | 11/2001 | Lewis et al. |
| 6,334,103 B1 | 12/2001 | Surace et al. |
| 6,345,240 B1 | 2/2002 | Havens |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |

(56) References Cited

U.S. PATENT DOCUMENTS

| | | |
|---|---|---|
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,915,294 B1 | 7/2005 | Singh et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,985,958 B2 | 1/2006 | Zwiegincew et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,007,026 B2 | 2/2006 | Wilkinson et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,036,681 B2 | 5/2006 | Suda et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,394 B2 | 10/2006 | Strong et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,171,350 B2 | 1/2007 | Lin et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,315,809 B2 | 1/2008 | Xun |
| 7,315,818 B2 | 1/2008 | Stevens et al. |
| 7,318,020 B1 | 1/2008 | Kim |
| 7,319,957 B2 | 1/2008 | Robinson et al. |
| 7,321,783 B2 | 1/2008 | Kim |
| 7,322,023 B2 | 1/2008 | Shulman et al. |
| 7,324,833 B2 | 1/2008 | White et al. |
| 7,324,947 B2 | 1/2008 | Jordan et al. |
| 7,328,155 B2 | 2/2008 | Endo et al. |
| 7,328,250 B2 | 2/2008 | Wang et al. |
| 7,333,998 B2 | 2/2008 | Heckerman et al. |
| 7,337,108 B2 | 2/2008 | Florencio et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,356,748 B2 | 4/2008 | Taleb |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,363,586 B1 | 4/2008 | Briggs et al. |
| 7,365,260 B2 | 4/2008 | Kawashima |
| 7,366,461 B1 | 4/2008 | Brown |
| 7,369,984 B2 | 5/2008 | Fairweather |
| 7,373,291 B2 | 5/2008 | Garst |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,110 B2 | 6/2008 | Petrunka et al. |

(56) References Cited

U.S. PATENT DOCUMENTS

| | | |
|---|---|---|
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,415,469 B2 | 8/2008 | Singh et al. |
| 7,418,382 B1 | 8/2008 | Maes |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,430,508 B2 | 9/2008 | Williamson et al. |
| 7,433,869 B2 | 10/2008 | Gollapudi |
| 7,433,921 B2 | 10/2008 | Ludwig et al. |
| 7,436,947 B2 | 10/2008 | Wadler et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,624 B2 | 11/2008 | Fuhrmann et al. |
| 7,447,635 B1 | 11/2008 | Konopka et al. |
| 7,447,637 B1 | 11/2008 | Grant et al. |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,251 B2 | 2/2009 | Gao et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,568,151 B2 | 7/2009 | Bargeron et al. |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,900 B1 | 12/2009 | Strom |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,430 B2 | 2/2010 | Ogawa |
| 7,657,828 B2 | 2/2010 | Lucas et al. |

(56) References Cited

U.S. PATENT DOCUMENTS

| | | |
|---|---|---|
| 7,657,844 B2 | 2/2010 | Gibson et al. |
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 | 3/2010 | Wibisono |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,689,916 B1 | 3/2010 | Goel et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,698,136 B1 | 4/2010 | Nguyen et al. |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,077 B1 | 5/2010 | Mikurak |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,419 B2 | 5/2010 | Lee et al. |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,176 B2 | 7/2010 | Vakil et al. |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,770,104 B2 | 8/2010 | Scopes |
| 7,774,202 B2 | 8/2010 | Spengler et al. |
| 7,774,204 B2 | 8/2010 | Mozer et al. |
| 7,774,388 B1 | 8/2010 | Runchey |
| 7,774,753 B1 | 8/2010 | Reilly et al. |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,069 B2 | 8/2010 | Frid-Nielsen et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,338 B2 | 9/2010 | Feng et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,813,729 B2 | 10/2010 | Lee et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 | 11/2010 | Smith et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,861,164 B2 | 12/2010 | Qin |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |

(56) References Cited

U.S. PATENT DOCUMENTS

| | | |
|---|---|---|
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,523 B2 | 1/2011 | Potter et al. |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,329 B2 | 2/2011 | Wu et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,364 B2 | 3/2011 | Yacoub |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,933,399 B2 | 4/2011 | Knott et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,176 B2 | 7/2011 | Latzina et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,001,125 B1 | 8/2011 | Magdalin et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,010,367 B2 | 8/2011 | Muschett et al. |
| 8,010,614 B1 | 8/2011 | Musat et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,032,409 B1 | 10/2011 | Mikurak |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,231 B2 | 10/2011 | Hirota et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,050,919 B2 | 11/2011 | Das |
| 8,054,180 B1 | 11/2011 | Scofield et al. |
| 8,055,296 B1 | 11/2011 | Persson et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,078,978 B2 | 12/2011 | Perry et al. |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,103,947 B2 | 1/2012 | Lunt et al. |
| 8,107,401 B2 | 1/2012 | John et al. |
| 8,112,275 B2 | 2/2012 | Kennewick et al. |
| 8,112,280 B2 | 2/2012 | Lu |
| 8,117,026 B2 | 2/2012 | Lee et al. |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |

(56) References Cited

U.S. PATENT DOCUMENTS

| | | |
|---|---|---|
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,171,137 B1 | 5/2012 | Parks et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,460 B2 | 6/2012 | Degani et al. |
| 8,195,467 B2 | 6/2012 | Mozer et al. |
| 8,195,468 B2 | 6/2012 | Kennewick et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,555 B1 | 7/2012 | Mianji |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,545 B2 | 8/2012 | Paek et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,117 B1 | 9/2012 | Xu et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,275,736 B2 | 9/2012 | Guo et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottier et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |

(56) References Cited

U.S. PATENT DOCUMENTS

| | | |
|---|---|---|
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,177 B1 | 7/2014 | Heigold et al. |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottier et al. |
| 8,868,111 B1 | 10/2014 | Kahn et al. |
| 8,868,409 B1 * | 10/2014 | Mengibar .............. G06F 40/30 704/9 |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-Jefri et al. |
| 9,043,208 B2 | 5/2015 | Koch et al. |
| 9,043,211 B2 | 5/2015 | Haiut et al. |
| 9,046,932 B2 | 6/2015 | Medlock et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |

(56) References Cited

U.S. PATENT DOCUMENTS

| | | |
|---|---|---|
| 9,071,701 B2 | 6/2015 | Donaldson et al. |
| 9,075,435 B1 | 7/2015 | Noble et al. |
| 9,076,448 B2 | 7/2015 | Bennett et al. |
| 9,076,450 B1 | 7/2015 | Sadek et al. |
| 9,081,411 B2 | 7/2015 | Kains et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,183,845 B1 | 11/2015 | Gopalakrishnan et al. |
| 9,190,062 B2 | 11/2015 | Haughay |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,236,047 B2 | 1/2016 | Rasmussen |
| 9,241,073 B1 | 1/2016 | Rensburg et al. |
| 9,251,713 B1 | 2/2016 | Giovanniello et al. |
| 9,255,812 B2 | 2/2016 | Maeoka et al. |
| 9,257,120 B1 * | 2/2016 | Alvarez Guevara ... G10L 15/18 |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,280,535 B2 | 3/2016 | Varma et al. |
| 9,282,211 B2 | 3/2016 | Osawa |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,349,368 B1 | 5/2016 | LeBeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,294 B1 | 10/2016 | Tunstall-Pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,519,453 B2 | 12/2016 | Perkuhn et al. |
| 9,524,355 B2 | 12/2016 | Forbes et al. |
| 9,531,862 B1 | 12/2016 | Vadodaria |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,619,200 B2 | 4/2017 | Chakladar et al. |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,822 B1 | 7/2017 | Naik et al. |
| 9,697,827 B1 | 7/2017 | Lilly et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,767,710 B2 | 9/2017 | Lee et al. |
| 9,786,271 B1 | 10/2017 | Combs et al. |
| 9,792,907 B2 | 10/2017 | Booklet et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,830,044 B2 | 11/2017 | Brown et al. |
| 9,830,449 B1 | 11/2017 | Wagner |

(56) References Cited

U.S. PATENT DOCUMENTS

| | | |
|---|---|---|
| 9,842,584 B1 | 12/2017 | Hart et al. |
| 9,846,685 B2 | 12/2017 | Li |
| 9,858,925 B2 | 1/2018 | Gruber et al. |
| 9,858,927 B1 | 1/2018 | Williams et al. |
| 9,886,953 B2 | 2/2018 | Lemay et al. |
| 9,887,949 B2 | 2/2018 | Shepherd et al. |
| 9,916,839 B1 | 3/2018 | Scalise et al. |
| 9,922,642 B2 | 3/2018 | Pitschel et al. |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,176 B1 | 6/2018 | Gray |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,681 B2 | 8/2018 | Brown et al. |
| 10,074,360 B2 | 9/2018 | Kim |
| 10,074,371 B1 | 9/2018 | Wang et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,198,877 B1 * | 2/2019 | Maltsev .................. G06F 9/54 |
| 10,199,051 B2 | 2/2019 | Binder et al. |
| 10,200,824 B2 | 2/2019 | Gross et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,229,356 B1 | 3/2019 | Liu et al. |
| 10,248,308 B2 | 4/2019 | Karunamuni et al. |
| 10,255,922 B1 | 4/2019 | Sharifi et al. |
| 10,269,345 B2 | 4/2019 | Castillo Sanchez et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,513 B1 | 6/2019 | D'souza et al. |
| 10,332,518 B2 | 6/2019 | Garg et al. |
| 10,346,753 B2 | 7/2019 | Soon-Shiong et al. |
| 10,353,975 B2 | 7/2019 | Oh et al. |
| 10,354,677 B2 | 7/2019 | Mohamed et al. |
| 10,356,243 B2 | 7/2019 | Sanghavi et al. |
| 10,366,692 B1 | 7/2019 | Adams et al. |
| 10,372,814 B2 | 8/2019 | Gliozzo et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,410,637 B2 | 9/2019 | Paulik et al. |
| 10,417,037 B2 | 9/2019 | Gruber et al. |
| 10,417,554 B2 | 9/2019 | Scheffler |
| 10,446,142 B2 | 10/2019 | Lim et al. |
| 10,469,665 B1 | 11/2019 | Bell |
| 10,474,961 B2 | 11/2019 | Brigham et al. |
| 10,496,705 B1 | 12/2019 | Irani et al. |
| 10,497,365 B2 | 12/2019 | Gruber et al. |
| 10,504,518 B1 | 12/2019 | Irani et al. |
| 10,521,946 B1 | 12/2019 | Roche et al. |
| 10,568,032 B2 | 2/2020 | Freeman et al. |
| 10,659,851 B2 | 5/2020 | Lister et al. |
| 10,757,499 B1 | 8/2020 | Vautrin et al. |
| 2001/0047264 A1 | 11/2001 | Roundtree |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0069071 A1 | 6/2002 | Knockeart et al. |
| 2002/0077817 A1 | 6/2002 | Atal |
| 2002/0091529 A1 | 7/2002 | Whitham |
| 2002/0103641 A1 | 8/2002 | Kuo et al. |
| 2002/0111198 A1 | 8/2002 | Heie et al. |
| 2002/0116185 A1 | 8/2002 | Cooper et al. |
| 2002/0164000 A1 | 11/2002 | Cohen et al. |
| 2002/0184015 A1 | 12/2002 | Li et al. |
| 2002/0198714 A1 | 12/2002 | Zhou |
| 2003/0003897 A1 | 1/2003 | Hyon |
| 2003/0018475 A1 | 1/2003 | Basu et al. |
| 2003/0122652 A1 | 7/2003 | Himmelstein et al. |
| 2003/0130847 A1 | 7/2003 | Case et al. |
| 2003/0135501 A1 | 7/2003 | Frerebeau et al. |
| 2003/0187659 A1 | 10/2003 | Cho et al. |
| 2003/0202697 A1 | 10/2003 | Simard et al. |
| 2003/0221198 A1 | 11/2003 | Sloo et al. |
| 2004/0030554 A1 | 2/2004 | Boxberger-Oberoi et al. |
| 2004/0049388 A1 | 3/2004 | Roth et al. |
| 2004/0093328 A1 | 5/2004 | Damle |
| 2004/0128614 A1 | 7/2004 | Andrews et al. |
| 2004/0135701 A1 | 7/2004 | Yasuda et al. |
| 2004/0186857 A1 | 9/2004 | Serlet et al. |
| 2004/0199387 A1 | 10/2004 | Wang et al. |
| 2004/0236778 A1 | 11/2004 | Junqua et al. |
| 2004/0260718 A1 | 12/2004 | Fedorov et al. |
| 2005/0021330 A1 | 1/2005 | Mano et al. |
| 2005/0042591 A1 | 2/2005 | Bloom et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0108642 A1 | 5/2005 | Sinclair et al. |
| 2005/0114124 A1 | 5/2005 | Liu et al. |
| 2005/0114306 A1 | 5/2005 | Shu et al. |
| 2005/0119897 A1 | 6/2005 | Bennett et al. |
| 2005/0143972 A1 | 6/2005 | Gopalakrishnan et al. |
| 2005/0159957 A1 | 7/2005 | Roth et al. |
| 2005/0165015 A1 | 7/2005 | Ncube et al. |
| 2005/0165607 A1 | 7/2005 | Di Fabbrizio et al. |
| 2005/0182629 A1 | 8/2005 | Coorman et al. |
| 2005/0196733 A1 | 9/2005 | Budra et al. |
| 2005/0262440 A1 | 11/2005 | Stanciu et al. |

(56) References Cited

U.S. PATENT DOCUMENTS

| | | | |
|---|---|---|---|
| 2005/0288936 A1 | 12/2005 | Busayapongchai et al. | |
| 2006/0018492 A1 | 1/2006 | Chiu et al. | |
| 2006/0075429 A1 | 4/2006 | Istvan et al. | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0117002 A1 | 6/2006 | Swen | |
| 2006/0122834 A1 | 6/2006 | Bennett | |
| 2006/0136352 A1 | 6/2006 | Brun et al. | |
| 2006/0142576 A1 | 6/2006 | Meng et al. | |
| 2006/0143007 A1 | 6/2006 | Koh et al. | |
| 2006/0149557 A1 | 7/2006 | Kaneko et al. | |
| 2006/0173683 A1 | 8/2006 | Roth et al. | |
| 2006/0217967 A1* | 9/2006 | Goertzen | G10L 15/26 704/201 |
| 2006/0235700 A1 | 10/2006 | Wong et al. | |
| 2007/0041361 A1 | 2/2007 | Iso-Sipila | |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0106674 A1 | 5/2007 | Agrawal et al. | |
| 2007/0118377 A1 | 5/2007 | Badino et al. | |
| 2007/0124132 A1 | 5/2007 | Takeuchi et al. | |
| 2007/0133771 A1 | 6/2007 | Stifelman et al. | |
| 2007/0135949 A1 | 6/2007 | Snover et al. | |
| 2007/0162274 A1 | 7/2007 | Ruiz et al. | |
| 2007/0174188 A1 | 7/2007 | Fish | |
| 2007/0185917 A1 | 8/2007 | Prahlad et al. | |
| 2007/0192026 A1 | 8/2007 | Lee et al. | |
| 2007/0192179 A1 | 8/2007 | Van et al. | |
| 2007/0198267 A1 | 8/2007 | Jones et al. | |
| 2007/0219645 A1 | 9/2007 | Thomas et al. | |
| 2007/0241885 A1 | 10/2007 | Clipsham et al. | |
| 2007/0282595 A1 | 12/2007 | Tunning et al. | |
| 2008/0001785 A1 | 1/2008 | Elizarov et al. | |
| 2008/0010050 A1 | 1/2008 | Fux et al. | |
| 2008/0010355 A1 | 1/2008 | Vieri et al. | |
| 2008/0010605 A1 | 1/2008 | Frank et al. | |
| 2008/0012950 A1 | 1/2008 | Lee et al. | |
| 2008/0013751 A1 | 1/2008 | Hiselius | |
| 2008/0015863 A1 | 1/2008 | Agapi et al. | |
| 2008/0015864 A1 | 1/2008 | Ross et al. | |
| 2008/0016575 A1 | 1/2008 | Vincent et al. | |
| 2008/0021708 A1 | 1/2008 | Bennett et al. | |
| 2008/0021886 A1 | 1/2008 | Wang-Aryattanwanich et al. | |
| 2008/0022208 A1 | 1/2008 | Morse | |
| 2008/0027711 A1 | 1/2008 | Rajendran et al. | |
| 2008/0027726 A1 | 1/2008 | Hansen et al. | |
| 2008/0031475 A1 | 2/2008 | Goldstein | |
| 2008/0033719 A1 | 2/2008 | Hall et al. | |
| 2008/0033723 A1 | 2/2008 | Jang et al. | |
| 2008/0034032 A1 | 2/2008 | Healey et al. | |
| 2008/0034044 A1 | 2/2008 | Bhakta et al. | |
| 2008/0036743 A1 | 2/2008 | Westerman et al. | |
| 2008/0040339 A1 | 2/2008 | Zhou et al. | |
| 2008/0042970 A1 | 2/2008 | Liang et al. | |
| 2008/0043936 A1 | 2/2008 | Liebermann | |
| 2008/0043943 A1 | 2/2008 | Sipher et al. | |
| 2008/0046239 A1 | 2/2008 | Boo | |
| 2008/0046250 A1 | 2/2008 | Agapi et al. | |
| 2008/0046422 A1 | 2/2008 | Lee et al. | |
| 2008/0046820 A1 | 2/2008 | Lee et al. | |
| 2008/0046948 A1 | 2/2008 | Verosub | |
| 2008/0048908 A1 | 2/2008 | Sato | |
| 2008/0050027 A1 | 2/2008 | Bashyam et al. | |
| 2008/0052063 A1 | 2/2008 | Bennett et al. | |
| 2008/0052073 A1 | 2/2008 | Goto et al. | |
| 2008/0052077 A1 | 2/2008 | Bennett et al. | |
| 2008/0052080 A1 | 2/2008 | Narayanan et al. | |
| 2008/0052262 A1 | 2/2008 | Kosinov et al. | |
| 2008/0055194 A1 | 3/2008 | Baudino et al. | |
| 2008/0056459 A1 | 3/2008 | Vallier et al. | |
| 2008/0056579 A1 | 3/2008 | Guha | |
| 2008/0057922 A1 | 3/2008 | Kokes et al. | |
| 2008/0059190 A1 | 3/2008 | Chu et al. | |
| 2008/0059200 A1 | 3/2008 | Puli | |
| 2008/0059876 A1 | 3/2008 | Hantier et al. | |
| 2008/0062141 A1 | 3/2008 | Chaudhri | |
| 2008/0065382 A1 | 3/2008 | Geri et al. | |
| 2008/0065387 A1 | 3/2008 | Cross et al. | |
| 2008/0071529 A1 | 3/2008 | Silverman et al. | |
| 2008/0071544 A1 | 3/2008 | Beaufays et al. | |
| 2008/0071742 A1 | 3/2008 | Yang et al. | |
| 2008/0072143 A1 | 3/2008 | Assadollahi | |
| 2008/0075296 A1 | 3/2008 | Lindahl et al. | |
| 2008/0076972 A1 | 3/2008 | Dorogusker et al. | |
| 2008/0077310 A1 | 3/2008 | Murlidar et al. | |
| 2008/0077384 A1 | 3/2008 | Agapi et al. | |
| 2008/0077386 A1 | 3/2008 | Gao et al. | |
| 2008/0077391 A1 | 3/2008 | Chino et al. | |
| 2008/0077393 A1 | 3/2008 | Gao et al. | |
| 2008/0077406 A1 | 3/2008 | Ganong, III | |
| 2008/0077859 A1 | 3/2008 | Schabes et al. | |
| 2008/0079566 A1 | 4/2008 | Singh et al. | |
| 2008/0080411 A1 | 4/2008 | Cole | |
| 2008/0082332 A1* | 4/2008 | Mallett | G10L 17/00 704/250 |
| 2008/0082338 A1 | 4/2008 | O'Neil et al. | |
| 2008/0082390 A1 | 4/2008 | Hawkins et al. | |
| 2008/0082576 A1 | 4/2008 | Bodin et al. | |
| 2008/0082651 A1 | 4/2008 | Singh et al. | |
| 2008/0084974 A1 | 4/2008 | Dhanakshirur | |
| 2008/0085689 A1 | 4/2008 | Zellner | |
| 2008/0091406 A1 | 4/2008 | Baldwin et al. | |
| 2008/0091426 A1 | 4/2008 | Rempel et al. | |
| 2008/0091428 A1 | 4/2008 | Bellegarda | |
| 2008/0091443 A1 | 4/2008 | Strope et al. | |
| 2008/0096531 A1 | 4/2008 | Mcquaide et al. | |
| 2008/0096533 A1 | 4/2008 | Manfredi et al. | |
| 2008/0096726 A1 | 4/2008 | Riley et al. | |
| 2008/0097937 A1 | 4/2008 | Hadjarian | |
| 2008/0098302 A1 | 4/2008 | Roose | |
| 2008/0098480 A1 | 4/2008 | Henry et al. | |
| 2008/0100579 A1 | 5/2008 | Robinson et al. | |
| 2008/0101584 A1 | 5/2008 | Gray et al. | |
| 2008/0103774 A1 | 5/2008 | White | |
| 2008/0109222 A1 | 5/2008 | Liu | |
| 2008/0109402 A1 | 5/2008 | Wang et al. | |
| 2008/0114480 A1 | 5/2008 | Harb | |
| 2008/0114598 A1 | 5/2008 | Prieto et al. | |
| 2008/0114604 A1 | 5/2008 | Wei et al. | |
| 2008/0114841 A1 | 5/2008 | Lambert | |
| 2008/0115084 A1 | 5/2008 | Scott et al. | |
| 2008/0118143 A1 | 5/2008 | Gordon et al. | |
| 2008/0119953 A1 | 5/2008 | Reed | |
| 2008/0120102 A1 | 5/2008 | Rao | |
| 2008/0120112 A1 | 5/2008 | Jordan et al. | |
| 2008/0120196 A1 | 5/2008 | Reed et al. | |
| 2008/0120311 A1 | 5/2008 | Reed | |
| 2008/0120312 A1 | 5/2008 | Reed | |
| 2008/0120330 A1 | 5/2008 | Reed | |
| 2008/0120342 A1 | 5/2008 | Reed et al. | |
| 2008/0122796 A1 | 5/2008 | Jobs et al. | |
| 2008/0124695 A1 | 5/2008 | Myers et al. | |
| 2008/0126075 A1 | 5/2008 | Thorn et al. | |
| 2008/0126077 A1 | 5/2008 | Thorn | |
| 2008/0126091 A1 | 5/2008 | Clark et al. | |
| 2008/0126093 A1 | 5/2008 | Sivadas | |
| 2008/0126100 A1 | 5/2008 | Grost et al. | |
| 2008/0126491 A1 | 5/2008 | Portele et al. | |
| 2008/0129520 A1 | 6/2008 | Lee | |
| 2008/0130867 A1 | 6/2008 | Bowen | |
| 2008/0131006 A1 | 6/2008 | Oliver | |
| 2008/0132221 A1 | 6/2008 | Willey et al. | |
| 2008/0132295 A1 | 6/2008 | Horowitz | |
| 2008/0133215 A1 | 6/2008 | Sarukkai | |
| 2008/0133228 A1 | 6/2008 | Rao | |
| 2008/0133230 A1 | 6/2008 | Herforth et al. | |
| 2008/0133241 A1 | 6/2008 | Baker et al. | |
| 2008/0133479 A1 | 6/2008 | Zelevinsky et al. | |
| 2008/0133956 A1 | 6/2008 | Fadell | |
| 2008/0140413 A1 | 6/2008 | Millman et al. | |
| 2008/0140415 A1 | 6/2008 | Shostak | |

(56) References Cited

U.S. PATENT DOCUMENTS

| | | |
|---|---|---|
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1 | 6/2008 | Reed et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154599 A1 | 6/2008 | Muschett et al. |
| 2008/0154600 A1 | 6/2008 | Tian et al. |
| 2008/0154603 A1 | 6/2008 | Oddo |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 | 7/2008 | Mactavish et al. |
| 2008/0162137 A1 | 7/2008 | Saitoh et al. |
| 2008/0162471 A1 | 7/2008 | Bernard |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0167876 A1 | 7/2008 | Bakis et al. |
| 2008/0168052 A1 | 7/2008 | Ott et al. |
| 2008/0168144 A1 | 7/2008 | Lee |
| 2008/0168366 A1 | 7/2008 | Kocienda et al. |
| 2008/0172698 A1 | 7/2008 | Berger et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201000 A1 | 8/2008 | Heikkila et al. |
| 2008/0201306 A1 | 8/2008 | Cooper et al. |
| 2008/0201375 A1 | 8/2008 | Khedouri et al. |
| 2008/0201434 A1 | 8/2008 | Holmes et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansal et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura et al. |
| 2008/0235023 A1 | 9/2008 | Kennewick et al. |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0242322 A1 | 10/2008 | Scott et al. |
| 2008/0242363 A1 | 10/2008 | Onda et al. |
| 2008/0243501 A1 | 10/2008 | Hafsteinsson et al. |
| 2008/0243834 A1 | 10/2008 | Rieman et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0261572 A1 | 10/2008 | Tsui et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0267416 A1 | 10/2008 | Goldstein et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0270344 A1 | 10/2008 | Yurick et al. |
| 2008/0273672 A1 | 11/2008 | Didcock et al. |
| 2008/0277473 A1 | 11/2008 | Kotlarsky et al. |
| 2008/0281510 A1 | 11/2008 | Shahine |
| 2008/0281582 A1 | 11/2008 | Hsu et al. |
| 2008/0288259 A1 | 11/2008 | Chambers et al. |
| 2008/0288460 A1 | 11/2008 | Poniatowski et al. |
| 2008/0292112 A1 | 11/2008 | Valenzuela et al. |
| 2008/0294418 A1 | 11/2008 | Cleary et al. |
| 2008/0294517 A1 | 11/2008 | Hill |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300871 A1 | 12/2008 | Gilbert |
| 2008/0300877 A1 | 12/2008 | Gilbert et al. |
| 2008/0300878 A1 | 12/2008 | Bennett |
| 2008/0301567 A1 | 12/2008 | Martin et al. |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |
| 2008/0319735 A1 | 12/2008 | Kambhatla et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006096 A1 | 1/2009 | Li et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |

(56) References Cited

U.S. PATENT DOCUMENTS

| | | |
|---|---|---|
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0028435 A1 | 1/2009 | Wu et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048841 A1 | 2/2009 | Pollet et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055380 A1 | 2/2009 | Peng et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076798 A1 | 3/2009 | Oh et al. |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077165 A1 | 3/2009 | Rhodes et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0091537 A1 | 4/2009 | Huang et al. |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0125602 A1 | 5/2009 | Bhatia et al. |
| 2009/0125947 A1 | 5/2009 | Ibaraki |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138736 A1 | 5/2009 | Chin |
| 2009/0138828 A1 | 5/2009 | Schultz et al. |
| 2009/0144036 A1 | 6/2009 | Jorgensen et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1* | 8/2009 | Mozer .................... G10L 15/32 704/275 |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |

(56) References Cited

U.S. PATENT DOCUMENTS

| | | |
|---|---|---|
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0278804 A1 | 11/2009 | Rubanovich et al. |
| 2009/0281789 A1 | 11/2009 | Waibel et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottier et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0007569 A1 | 1/2010 | Sim et al. |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0017741 A1 | 1/2010 | Karp et al. |
| 2010/0019834 A1 | 1/2010 | Zerbe et al. |
| 2010/0020035 A1 | 1/2010 | Ryu et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030562 A1 | 2/2010 | Yoshizawa et al. |
| 2010/0030928 A1 | 2/2010 | Conroy et al. |
| 2010/0031143 A1 | 2/2010 | Rao et al. |
| 2010/0031150 A1 | 2/2010 | Andrew |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036829 A1 | 2/2010 | Leyba |
| 2010/0036928 A1 | 2/2010 | Granito et al. |
| 2010/0037183 A1 | 2/2010 | Miyashita et al. |
| 2010/0037187 A1 | 2/2010 | Kondziela |
| 2010/0039495 A1 | 2/2010 | Rahman et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0050074 A1 | 2/2010 | Nachmani et al. |
| 2010/0054512 A1 | 3/2010 | Solum |
| 2010/0054601 A1 | 3/2010 | Anbalagan et al. |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |

(56) References Cited

U.S. PATENT DOCUMENTS

| | | |
|---|---|---|
| 2010/0071003 A1 | 3/2010 | Bychkov et al. |
| 2010/0073201 A1 | 3/2010 | Holcomb et al. |
| 2010/0076760 A1 | 3/2010 | Kraenzel et al. |
| 2010/0076968 A1 | 3/2010 | Boyns et al. |
| 2010/0076993 A1 | 3/2010 | Klawitter et al. |
| 2010/0077350 A1 | 3/2010 | Lim et al. |
| 2010/0077469 A1 | 3/2010 | Furman et al. |
| 2010/0079501 A1 | 4/2010 | Ikeda et al. |
| 2010/0079508 A1 | 4/2010 | Hodge et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082239 A1 | 4/2010 | Hardy et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082343 A1 | 4/2010 | Levit et al. |
| 2010/0082345 A1 | 4/2010 | Wang et al. |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082376 A1 | 4/2010 | Levitt |
| 2010/0082567 A1 | 4/2010 | Rosenblatt et al. |
| 2010/0082653 A1 | 4/2010 | Nair |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0099354 A1 | 4/2010 | Johnson |
| 2010/0100080 A1 | 4/2010 | Huculak et al. |
| 2010/0100212 A1 | 4/2010 | Lindahl et al. |
| 2010/0100371 A1 | 4/2010 | Yuezhong et al. |
| 2010/0100384 A1 | 4/2010 | Ju et al. |
| 2010/0100385 A1 | 4/2010 | Davis et al. |
| 2010/0100515 A1 | 4/2010 | Bangalore et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0106975 A1 | 4/2010 | Vandervort |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0122306 A1 | 5/2010 | Pratt et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0127854 A1 | 5/2010 | Helvick et al. |
| 2010/0128701 A1 | 5/2010 | Nagaraja |
| 2010/0131265 A1 | 5/2010 | Liu et al. |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0153576 A1 | 6/2010 | Wohlert et al. |
| 2010/0153968 A1 | 6/2010 | Engel |
| 2010/0158207 A1 | 6/2010 | Dhawan et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185434 A1 | 7/2010 | Burvall et al. |
| 2010/0185448 A1 | 7/2010 | Meisel |
| 2010/0185949 A1 | 7/2010 | Jaeger |
| 2010/0191466 A1 | 7/2010 | Deluca et al. |
| 2010/0191520 A1 | 7/2010 | Gruhn et al. |
| 2010/0192221 A1 | 7/2010 | Waggoner |
| 2010/0195865 A1 | 8/2010 | Luff |
| 2010/0197359 A1 | 8/2010 | Harris |
| 2010/0198821 A1 | 8/2010 | Loritz et al. |
| 2010/0199180 A1 | 8/2010 | Brichter et al. |
| 2010/0199215 A1 | 8/2010 | Seymour et al. |
| 2010/0199340 A1 | 8/2010 | Jonas et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0215195 A1 | 8/2010 | Harma et al. |
| 2010/0216509 A1 | 8/2010 | Riemer et al. |
| 2010/0217581 A1 | 8/2010 | Hong |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |
| 2010/0235793 A1 | 9/2010 | Ording et al. |
| 2010/0241418 A1 | 9/2010 | Maeda et al. |
| 2010/0246784 A1 | 9/2010 | Frazier et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0257490 A1 | 10/2010 | Lyon et al. |
| 2010/0262599 A1 | 10/2010 | Nitz |
| 2010/0263015 A1 | 10/2010 | Pandey et al. |
| 2010/0268537 A1 | 10/2010 | Al-Telmissani |
| 2010/0268539 A1 | 10/2010 | Xu et al. |
| 2010/0269040 A1 | 10/2010 | Lee |
| 2010/0274482 A1 | 10/2010 | Feng |

(56) References Cited

U.S. PATENT DOCUMENTS

| | | |
|---|---|---|
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278391 A1 | 11/2010 | Hsu et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287241 A1 | 11/2010 | Swanburg et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0299444 A1 | 11/2010 | Nile et al. |
| 2010/0302056 A1 | 12/2010 | Dutton et al. |
| 2010/0303254 A1 | 12/2010 | Yoshizawa et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0311395 A1 | 12/2010 | Zheng et al. |
| 2010/0312547 A1 | 12/2010 | Van Os et al. |
| 2010/0312566 A1 | 12/2010 | Odinak et al. |
| 2010/0318293 A1 | 12/2010 | Brush et al. |
| 2010/0318357 A1 | 12/2010 | Istvan et al. |
| 2010/0318366 A1 | 12/2010 | Sullivan et al. |
| 2010/0318570 A1 | 12/2010 | Narasinghanallur et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332003 A1 | 12/2010 | Yaguez |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0028083 A1 | 2/2011 | Soitis |
| 2011/0029616 A1 | 2/2011 | Wang et al. |
| 2011/0029637 A1 | 2/2011 | Morse |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0039584 A1 | 2/2011 | Merrett |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047246 A1 | 2/2011 | Frissora et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055244 A1 | 3/2011 | Donelli |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0060812 A1 | 3/2011 | Middleton |
| 2011/0064378 A1 | 3/2011 | Gharaat et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066602 A1 | 3/2011 | Studer et al. |
| 2011/0066634 A1 | 3/2011 | Phillips et al. |
| 2011/0072033 A1 | 3/2011 | White |
| 2011/0072114 A1 | 3/2011 | Hoffert et al. |
| 2011/0072492 A1 | 3/2011 | Mohler et al. |
| 2011/0075818 A1 | 3/2011 | Vance et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0099157 A1 | 4/2011 | LeBeau et al. |
| 2011/0102161 A1 | 5/2011 | Heubel et al. |
| 2011/0103682 A1 | 5/2011 | Chidlovskii et al. |
| 2011/0105097 A1 | 5/2011 | Tadayon et al. |
| 2011/0106534 A1 | 5/2011 | Lebeau et al. |
| 2011/0106536 A1 | 5/2011 | Klappert |
| 2011/0106736 A1 | 5/2011 | Aharonson et al. |
| 2011/0106878 A1 | 5/2011 | Cho et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116480 A1 | 5/2011 | Li et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119713 A1 | 5/2011 | Chang et al. |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |

(56) References Cited

U.S. PATENT DOCUMENTS

| | | |
|---|---|---|
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0137664 A1 | 6/2011 | Kho et al. |
| 2011/0141141 A1 | 6/2011 | Kankainen |
| 2011/0143718 A1 | 6/2011 | Engelhart, Sr. |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151415 A1 | 6/2011 | Darling et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153325 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0166855 A1 | 7/2011 | Vermeulen et al. |
| 2011/0166862 A1 | 7/2011 | Eshed et al. |
| 2011/0167350 A1 | 7/2011 | Hoellwarth |
| 2011/0173003 A1 | 7/2011 | Levanon et al. |
| 2011/0173537 A1 | 7/2011 | Hemphill |
| 2011/0175810 A1 | 7/2011 | Markovic et al. |
| 2011/0178804 A1 | 7/2011 | Inoue et al. |
| 2011/0179002 A1 | 7/2011 | Dumitru et al. |
| 2011/0179372 A1 | 7/2011 | Moore et al. |
| 2011/0183627 A1 | 7/2011 | Ueda et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0184789 A1 | 7/2011 | Kirsch |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Paek et al. |
| 2011/0202526 A1 | 8/2011 | Lee et al. |
| 2011/0202594 A1 | 8/2011 | Ricci |
| 2011/0202874 A1 | 8/2011 | Ramer et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231189 A1 | 9/2011 | Anastasiadis et al. |
| 2011/0231218 A1 | 9/2011 | Tovar |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0252108 A1 | 10/2011 | Morris et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264530 A1 | 10/2011 | Santangelo et al. |
| 2011/0264643 A1 | 10/2011 | Cao |
| 2011/0264999 A1 | 10/2011 | Bells et al. |
| 2011/0270604 A1 | 11/2011 | Qi et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0280143 A1 | 11/2011 | Li et al. |
| 2011/0282663 A1 | 11/2011 | Talwar et al. |
| 2011/0282888 A1 | 11/2011 | Koperski et al. |
| 2011/0282903 A1 | 11/2011 | Zhang |
| 2011/0282906 A1 | 11/2011 | Wong |
| 2011/0283189 A1 | 11/2011 | McCarty |
| 2011/0283190 A1 | 11/2011 | Poltorak |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0288917 A1 | 11/2011 | Wanek et al. |
| 2011/0289530 A1 | 11/2011 | Dureau et al. |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Waibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0313803 A1 | 12/2011 | Friend et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0314539 A1 | 12/2011 | Horton |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |

(56) References Cited

U.S. PATENT DOCUMENTS

| | | |
|---|---|---|
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130995 A1 | 5/2012 | Risvik et al. |
| 2012/0135714 A1 | 5/2012 | King, II |
| 2012/0136529 A1 | 5/2012 | Curtis et al. |
| 2012/0136572 A1 | 5/2012 | Norton |
| 2012/0136649 A1 | 5/2012 | Freising et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0203767 A1 | 8/2012 | Williams et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0262296 A1 | 10/2012 | Bezar |

(56) References Cited

U.S. PATENT DOCUMENTS

| | | |
|---|---|---|
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Perez Cortes et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0018659 A1 | 1/2013 | Chi |
| 2013/0018863 A1 | 1/2013 | Regan et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0060571 A1 | 3/2013 | Soemo et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0107053 A1 | 5/2013 | Ozaki |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0124672 A1 | 5/2013 | Pan |
| 2013/0125168 A1 | 5/2013 | Agnihotri et al. |

(56) References Cited

U.S. PATENT DOCUMENTS

| | | |
|---|---|---|
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottier et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0183942 A1 | 7/2013 | Novick et al. |
| 2013/0183944 A1 | 7/2013 | Mozer et al. |
| 2013/0185059 A1 | 7/2013 | Riccardi et al. |
| 2013/0185066 A1 | 7/2013 | Tzirkel-Hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238326 A1 | 9/2013 | Kim et al. |
| 2013/0238647 A1 | 9/2013 | Thompson |
| 2013/0238729 A1 | 9/2013 | Holzman et al. |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Naik |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0339256 A1 | 12/2013 | Shroff |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346065 A1 | 12/2013 | Davidson et al. |
| 2013/0346068 A1 | 12/2013 | Solem et al. |
| 2013/0346347 A1 | 12/2013 | Patterson et al. |

(56) References Cited

U.S. PATENT DOCUMENTS

| | | |
|---|---|---|
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012580 A1 | 1/2014 | Ganong et al. |
| 2014/0012586 A1 | 1/2014 | Rubin et al. |
| 2014/0012587 A1 | 1/2014 | Park |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028029 A1 | 1/2014 | Jochman |
| 2014/0028477 A1 | 1/2014 | Michalske |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040918 A1 | 2/2014 | Li et al. |
| 2014/0040961 A1 | 2/2014 | Green et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0068751 A1 | 3/2014 | Last et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0075453 A1 | 3/2014 | Bellessort et al. |
| 2014/0078065 A1 | 3/2014 | Akkok et al. |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar et al. |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082715 A1 | 3/2014 | Grajek et al. |
| 2014/0086458 A1 | 3/2014 | Rogers et al. |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095601 A1 | 4/2014 | Abuelsaad et al. |
| 2014/0095965 A1 | 4/2014 | Li |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108391 A1 | 4/2014 | Volkert |
| 2014/0112556 A1 | 4/2014 | Kalinli-akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157319 A1 | 6/2014 | Kimura et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0169795 A1 | 6/2014 | Clough |
| 2014/0171064 A1 | 6/2014 | Das |
| 2014/0172878 A1 | 6/2014 | Clark et al. |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188460 A1 | 7/2014 | Ouyang et al. |

(56) References Cited

U.S. PATENT DOCUMENTS

| | | |
|---|---|---|
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215513 A1 | 7/2014 | Ramer et al. |
| 2014/0218372 A1 | 8/2014 | Missig et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kains et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Veld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kains et al. |
| 2014/0342762 A1 | 11/2014 | Hajdu et al. |
| 2014/0343834 A1 | 11/2014 | Demerchant et al. |
| 2014/0343943 A1 | 11/2014 | Al-Telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |

(56) References Cited

U.S. PATENT DOCUMENTS

| | | |
|---|---|---|
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0358549 A1 | 12/2014 | O'connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0379798 A1 | 12/2014 | Bunner et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0006148 A1 | 1/2015 | Goldszmit et al. |
| 2015/0006157 A1 | 1/2015 | Andrade Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-Hancock et al. |
| 2015/0019221 A1 | 1/2015 | Lee et al. |
| 2015/0019944 A1 | 1/2015 | Kalgi |
| 2015/0019974 A1 | 1/2015 | Doi et al. |
| 2015/0025405 A1 | 1/2015 | Vairavan et al. |
| 2015/0026620 A1 | 1/2015 | Kwon et al. |
| 2015/0027178 A1 | 1/2015 | Scalisi |
| 2015/0031416 A1 | 1/2015 | Wells et al. |
| 2015/0032443 A1 | 1/2015 | Karov et al. |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobsen et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Softer et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067822 A1 | 3/2015 | Randall |
| 2015/0071121 A1 | 3/2015 | Patil et al. |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095268 A1 | 4/2015 | Greenzeiger et al. |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0106737 A1 | 4/2015 | Montoy-Wilson et al. |
| 2015/0113407 A1 | 4/2015 | Hoffert et al. |
| 2015/0113435 A1 | 4/2015 | Phillips |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149177 A1 | 5/2015 | Kains et al. |
| 2015/0149182 A1 | 5/2015 | Kains et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162001 A1 | 6/2015 | Kar et al. |

(56) References Cited

U.S. PATENT DOCUMENTS

| | | |
|---|---|---|
| 2015/0162006 A1 | 6/2015 | Kummer |
| 2015/0163558 A1 | 6/2015 | Wheatley |
| 2015/0169081 A1 | 6/2015 | Neels et al. |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179176 A1 | 6/2015 | Ryu et al. |
| 2015/0181285 A1 | 6/2015 | Zhang et al. |
| 2015/0185964 A1 | 7/2015 | Stout |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0220264 A1 | 8/2015 | Lewis |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221304 A1 | 8/2015 | Stewart |
| 2015/0221307 A1 | 8/2015 | Shah et al. |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234636 A1 | 8/2015 | Barnes, Jr. |
| 2015/0234800 A1 | 8/2015 | Patrick et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0253146 A1 | 9/2015 | Annapureddy et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0269139 A1 | 9/2015 | McAteer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0295915 A1 | 10/2015 | Xiu |
| 2015/0301796 A1 | 10/2015 | Visser et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |

(56) References Cited

U.S. PATENT DOCUMENTS

| | | |
|---|---|---|
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371665 A1 | 12/2015 | Naik et al. |
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Napolitano et al. |
| 2015/0382079 A1 | 12/2015 | Lister et al. |
| 2015/0382147 A1 | 12/2015 | Clark et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0021414 A1 | 1/2016 | Padi et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0062605 A1 | 3/2016 | Agarwal et al. |
| 2016/0063094 A1 | 3/2016 | Udupa et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091967 A1 | 3/2016 | Prokofieva et al. |
| 2016/0092434 A1 | 3/2016 | Bellegarda |
| 2016/0092447 A1 | 3/2016 | Venkataraman et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0111091 A1 | 4/2016 | Bakish |
| 2016/0112746 A1 | 4/2016 | Zhang et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0150020 A1 | 5/2016 | Farmer et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanbion et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0210551 A1 | 7/2016 | Lee et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1 | 8/2016 | Pender |
| 2016/0225372 A1 | 8/2016 | Cheung et al. |
| 2016/0227107 A1 | 8/2016 | Beaumont |
| 2016/0232500 A1 | 8/2016 | Wang et al. |
| 2016/0239645 A1 | 8/2016 | Heo et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |

(56) References Cited

U.S. PATENT DOCUMENTS

| | | |
|---|---|---|
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293168 A1 | 10/2016 | Chen |
| 2016/0294755 A1 | 10/2016 | Prabhu |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0307566 A1 | 10/2016 | Bellegarda |
| 2016/0308799 A1 | 10/2016 | Schubert et al. |
| 2016/0313906 A1 | 10/2016 | Kilchenko et al. |
| 2016/0314788 A1 | 10/2016 | Jitkoff et al. |
| 2016/0314792 A1 | 10/2016 | Alvarez et al. |
| 2016/0315996 A1 | 10/2016 | Ha et al. |
| 2016/0317924 A1 | 11/2016 | Tanaka et al. |
| 2016/0321239 A1 | 11/2016 | Iso-Sipila et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfeild et al. |
| 2016/0322048 A1 | 11/2016 | Amano et al. |
| 2016/0322050 A1 | 11/2016 | Wang et al. |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335532 A1 | 11/2016 | Sanghavi et al. |
| 2016/0336007 A1 | 11/2016 | Hanazawa |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0003931 A1 | 1/2017 | Dvortsov et al. |
| 2017/0004824 A1 | 1/2017 | Yoo et al. |
| 2017/0005818 A1 | 1/2017 | Gould |
| 2017/0011091 A1 | 1/2017 | Chehreghani |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0031576 A1 | 2/2017 | Saoji et al. |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0047063 A1 | 2/2017 | Ohmura et al. |
| 2017/0053652 A1 | 2/2017 | Choi et al. |
| 2017/0055895 A1 | 3/2017 | Des Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0075653 A1 | 3/2017 | Dawidowsky et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0090569 A1 | 3/2017 | Levesque |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0110117 A1 | 4/2017 | Chakladar et al. |
| 2017/0116177 A1 | 4/2017 | Walia |
| 2017/0116982 A1 | 4/2017 | Gelfenbeyn et al. |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140644 A1 | 5/2017 | Hwang et al. |
| 2017/0140760 A1 | 5/2017 | Sachdev |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0155940 A1 | 6/2017 | Jin et al. |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0162191 A1 | 6/2017 | Grost et al. |
| 2017/0162203 A1 | 6/2017 | Huang et al. |
| 2017/0169818 A1 | 6/2017 | Vanbion et al. |

(56) References Cited

U.S. PATENT DOCUMENTS

| | | |
|---|---|---|
| 2017/0169819 A1 | 6/2017 | Mese et al. |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195636 A1 | 7/2017 | Child et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0206899 A1 | 7/2017 | Bryant et al. |
| 2017/0215052 A1 | 7/2017 | Koum et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0238039 A1 | 8/2017 | Sabattini |
| 2017/0242653 A1 | 8/2017 | Lang et al. |
| 2017/0242657 A1 | 8/2017 | Jarvis et al. |
| 2017/0243468 A1 | 8/2017 | Dotan-Cohen et al. |
| 2017/0243576 A1 | 8/2017 | Millington et al. |
| 2017/0243586 A1 | 8/2017 | Civeili et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0264711 A1 | 9/2017 | Natarajan et al. |
| 2017/0270912 A1 | 9/2017 | Levit et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay et al. |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0337035 A1 | 11/2017 | Choudhary et al. |
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0024985 A1 | 1/2018 | Asano |
| 2018/0033431 A1 | 2/2018 | Newendorp et al. |
| 2018/0033436 A1 | 2/2018 | Zhou |
| 2018/0047201 A1 | 2/2018 | Filev et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0069743 A1 | 3/2018 | Bakken et al. |
| 2018/0075847 A1 | 3/2018 | Lee et al. |
| 2018/0088969 A1 | 3/2018 | Vanbion et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0102914 A1 | 4/2018 | Kawachi et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0113673 A1 | 4/2018 | Sheynblat |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143967 A1 | 5/2018 | Anbazhagan et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0157372 A1 | 6/2018 | Kurabayashi |
| 2018/0157992 A1 | 6/2018 | Susskind et al. |
| 2018/0158548 A1 | 6/2018 | Taheri et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |

(56) References Cited

U.S. PATENT DOCUMENTS

| | | |
|---|---|---|
| 2018/0182376 A1 | 6/2018 | Gysel et al. |
| 2018/0188840 A1 | 7/2018 | Tamura et al. |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0210874 A1 | 7/2018 | Fuxman et al. |
| 2018/0213448 A1 | 7/2018 | Segal et al. |
| 2018/0218735 A1 | 8/2018 | Hunt et al. |
| 2018/0225274 A1 | 8/2018 | Tommy et al. |
| 2018/0232203 A1 | 8/2018 | Gelfenbeyn et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268106 A1 | 9/2018 | Velaga |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314552 A1 | 11/2018 | Kim et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336920 A1 | 11/2018 | Bastian et al. |
| 2018/0341643 A1 | 11/2018 | Alders et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0373487 A1 | 12/2018 | Gruber et al. |
| 2018/0374484 A1 | 12/2018 | Huang et al. |
| 2019/0012141 A1 | 1/2019 | Piersol et al. |
| 2019/0012449 A1 | 1/2019 | Cheyer |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035405 A1 | 1/2019 | Haughay |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0045040 A1 | 2/2019 | Lee et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0080685 A1 | 3/2019 | Johnson, Jr. |
| 2019/0080698 A1 | 3/2019 | Miller |
| 2019/0087412 A1 | 3/2019 | Seyed Ibrahim et al. |
| 2019/0087455 A1 | 3/2019 | He et al. |
| 2019/0095050 A1 | 3/2019 | Gruber et al. |
| 2019/0095171 A1 | 3/2019 | Carson et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129615 A1 | 5/2019 | Sundar et al. |
| 2019/0132694 A1 | 5/2019 | Hanes et al. |
| 2019/0139541 A1 | 5/2019 | Andersen et al. |
| 2019/0141494 A1 | 5/2019 | Gross et al. |
| 2019/0147880 A1 | 5/2019 | Booker et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0164546 A1 | 5/2019 | Piernot et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0197053 A1 | 6/2019 | Graham et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0287522 A1 | 9/2019 | Lambourne et al. |
| 2019/0295544 A1 | 9/2019 | Garcia et al. |
| 2019/0303442 A1 | 10/2019 | Peitz et al. |
| 2019/0310765 A1 | 10/2019 | Napolitano et al. |
| 2019/0318739 A1 | 10/2019 | Garg et al. |
| 2019/0339784 A1 | 11/2019 | Lemay et al. |

(56) References Cited

U.S. PATENT DOCUMENTS

| | | |
|---|---|---|
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0348022 A1 | 11/2019 | Park et al. |
| 2019/0354548 A1 | 11/2019 | Orr et al. |
| 2019/0355346 A1 | 11/2019 | Bellegarda |
| 2019/0361729 A1 | 11/2019 | Gruber et al. |
| 2019/0369748 A1 | 12/2019 | Hindi et al. |
| 2019/0369842 A1 | 12/2019 | Dolbakian et al. |
| 2019/0370292 A1 | 12/2019 | Irani et al. |
| 2019/0370323 A1 | 12/2019 | Davidson et al. |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2020/0019609 A1 | 1/2020 | Yu et al. |
| 2020/0042334 A1 | 2/2020 | Radebaugh et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0053218 A1 | 2/2020 | Gray |
| 2020/0058299 A1 | 2/2020 | Lee et al. |
| 2020/0075018 A1 | 3/2020 | Chen |
| 2020/0091958 A1 | 3/2020 | Curtis et al. |
| 2020/0092625 A1 | 3/2020 | Raffle |
| 2020/0098362 A1 | 3/2020 | Piemot et al. |
| 2020/0098368 A1 | 3/2020 | Lemay et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piemot et al. |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0135209 A1 | 4/2020 | Delfarah et al. |
| 2020/0137230 A1 | 4/2020 | Spohrer |
| 2020/0143812 A1 | 5/2020 | Walker, II et al. |
| 2020/0159579 A1 | 5/2020 | Shear et al. |
| 2020/0160179 A1 | 5/2020 | Chien et al. |
| 2020/0169637 A1 | 5/2020 | Sanghavi et al. |
| 2020/0175566 A1 | 6/2020 | Bender et al. |
| 2020/0184964 A1 | 6/2020 | Myers et al. |
| 2020/0193997 A1 | 6/2020 | Piernot et al. |
| 2020/0221155 A1 | 7/2020 | Hansen et al. |
| 2020/0227034 A1 | 7/2020 | Summa et al. |
| 2020/0249985 A1 | 8/2020 | Zeitlin |
| 2020/0252508 A1 | 8/2020 | Gray |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0327895 A1 | 10/2020 | Gruber et al. |
| 2020/0356243 A1 | 11/2020 | Meyer et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0365155 A1 | 11/2020 | Milden |
| 2020/0372904 A1 | 11/2020 | Vescovi et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |

FOREIGN PATENT DOCUMENTS

| | | |
|---|---|---|
| AU | 2015101171 A4 | 10/2015 |
| AU | 2018100187 A4 | 3/2018 |
| AU | 2017222436 A1 | 10/2018 |
| CA | 2670562 A1 | 1/2010 |
| CA | 2694314 A1 | 8/2010 |
| CA | 2792412 A1 | 7/2011 |
| CA | 2666438 C | 6/2013 |
| CH | 681573 A5 | 4/1993 |
| CN | 1975715 A | 6/2007 |
| CN | 1995917 A | 7/2007 |
| CN | 101162153 A | 4/2008 |
| CN | 101174366 A | 5/2008 |
| CN | 101179754 A | 5/2008 |
| CN | 101183525 A | 5/2008 |
| CN | 101188644 A | 5/2008 |
| CN | 101228503 A | 7/2008 |
| CN | 101233741 A | 7/2008 |
| CN | 101246020 A | 8/2008 |
| CN | 101271689 A | 9/2008 |
| CN | 101277501 A | 10/2008 |
| CN | 101297541 A | 10/2008 |
| CN | 101325756 A | 12/2008 |
| CN | 101416471 A | 4/2009 |
| CN | 101427244 A | 5/2009 |
| CN | 101448340 A | 6/2009 |
| CN | 101453498 A | 6/2009 |
| CN | 101499156 A | 8/2009 |
| CN | 101500041 A | 8/2009 |
| CN | 101535983 A | 9/2009 |
| CN | 101547396 A | 9/2009 |
| CN | 101557432 A | 10/2009 |
| CN | 101604521 A | 12/2009 |
| CN | 101632316 A | 1/2010 |
| CN | 101636736 A | 1/2010 |
| CN | 101667424 A | 3/2010 |
| CN | 101673544 A | 3/2010 |
| CN | 101751387 A | 6/2010 |
| CN | 101833286 A | 9/2010 |
| CN | 101847405 A | 9/2010 |
| CN | 101855521 A | 10/2010 |
| CN | 101894547 A | 11/2010 |
| CN | 101910960 A | 12/2010 |
| CN | 101923853 A | 12/2010 |
| CN | 101930789 A | 12/2010 |
| CN | 101939740 A | 1/2011 |
| CN | 101951553 A | 1/2011 |
| CN | 101958958 A | 1/2011 |
| CN | 101971250 A | 2/2011 |
| CN | 101992779 A | 3/2011 |
| CN | 102056026 A | 5/2011 |
| CN | 102122506 A | 7/2011 |
| CN | 102124515 A | 7/2011 |
| CN | 102137085 A | 7/2011 |
| CN | 102137193 A | 7/2011 |
| CN | 102160043 A | 8/2011 |
| CN | 102201235 A | 9/2011 |
| CN | 102214187 A | 10/2011 |
| CN | 102237088 A | 11/2011 |
| CN | 102246136 A | 11/2011 |
| CN | 202035047 U | 11/2011 |

(56) References Cited

FOREIGN PATENT DOCUMENTS

| | | | |
|---|---|---|---|
| CN | 102282609 A | 12/2011 |
| CN | 202092650 U | 12/2011 |
| CN | 102340590 A | 2/2012 |
| CN | 102346557 A | 2/2012 |
| CN | 102368256 A | 3/2012 |
| CN | 102402985 A | 4/2012 |
| CN | 102405463 A | 4/2012 |
| CN | 102498457 A | 6/2012 |
| CN | 102510426 A | 6/2012 |
| CN | 102629246 A | 8/2012 |
| CN | 102651217 A | 8/2012 |
| CN | 102681896 A | 9/2012 |
| CN | 102682769 A | 9/2012 |
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102722478 A | 10/2012 |
| CN | 102737104 A | 10/2012 |
| CN | 102750087 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102917004 A | 2/2013 |
| CN | 102917271 A | 2/2013 |
| CN | 102918493 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103093334 A | 5/2013 |
| CN | 103135916 A | 6/2013 |
| CN | 103198831 A | 7/2013 |
| CN | 103209369 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103292437 A | 9/2013 |
| CN | 103327063 A | 9/2013 |
| CN | 103365279 A | 10/2013 |
| CN | 103366741 A | 10/2013 |
| CN | 103390016 A | 11/2013 |
| CN | 103412789 A | 11/2013 |
| CN | 103426428 A | 12/2013 |
| CN | 103455234 A | 12/2013 |
| CN | 103456306 A | 12/2013 |
| CN | 103533143 A | 1/2014 |
| CN | 103533154 A | 1/2014 |
| CN | 103543902 A | 1/2014 |
| CN | 103562863 A | 2/2014 |
| CN | 103608859 A | 2/2014 |
| CN | 103645876 A | 3/2014 |
| CN | 103716454 A | 4/2014 |
| CN | 103727948 A | 4/2014 |
| CN | 103744761 A | 4/2014 |
| CN | 103760984 A | 4/2014 |
| CN | 103765385 A | 4/2014 |
| CN | 103792985 A | 5/2014 |
| CN | 103794212 A | 5/2014 |
| CN | 103795850 A | 5/2014 |
| CN | 103841268 A | 6/2014 |
| CN | 103902373 A | 7/2014 |
| CN | 103930945 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 104038621 A | 9/2014 |
| CN | 104090652 A | 10/2014 |
| CN | 104113471 A | 10/2014 |
| CN | 104125322 A | 10/2014 |
| CN | 104144377 A | 11/2014 |
| CN | 104169837 A | 11/2014 |
| CN | 104180815 A | 12/2014 |
| CN | 104243699 A | 12/2014 |
| CN | 104281259 A | 1/2015 |
| CN | 104284257 A | 1/2015 |
| CN | 104335207 A | 2/2015 |
| CN | 104335234 A | 2/2015 |
| CN | 104374399 A | 2/2015 |
| CN | 104423625 A | 3/2015 |
| CN | 104427104 A | 3/2015 |
| CN | 104463552 A | 3/2015 |
| CN | 104487929 A | 4/2015 |
| CN | 104516522 A | 4/2015 |
| CN | 104573472 A | 4/2015 |
| CN | 104575501 A | 4/2015 |
| CN | 104584010 A | 4/2015 |
| CN | 104604274 A | 5/2015 |
| CN | 104679472 A | 6/2015 |
| CN | 104769584 A | 7/2015 |
| CN | 104854583 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105190607 A | 12/2015 |
| CN | 105247511 A | 1/2016 |
| CN | 105264524 A | 1/2016 |
| CN | 105278681 A | 1/2016 |
| CN | 105320251 A | 2/2016 |
| CN | 105320726 A | 2/2016 |
| CN | 105379234 A | 3/2016 |
| CN | 105430186 A | 3/2016 |
| CN | 105471705 A | 4/2016 |
| CN | 105472587 A | 4/2016 |
| CN | 105556592 A | 5/2016 |
| CN | 105808200 A | 7/2016 |
| CN | 105830048 A | 8/2016 |
| CN | 105869641 A | 8/2016 |
| CN | 106030699 A | 10/2016 |
| CN | 106062734 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106534469 A | 3/2017 |
| CN | 106776581 A | 5/2017 |
| CN | 107450800 A | 12/2017 |
| CN | 107480161 A | 12/2017 |
| CN | 107491468 A | 12/2017 |
| CN | 107545262 A | 1/2018 |
| CN | 107608998 A | 1/2018 |
| CN | 107615378 A | 1/2018 |
| CN | 107871500 A | 4/2018 |
| CN | 107919123 A | 4/2018 |
| CN | 107924313 A | 4/2018 |
| CN | 107978313 A | 5/2018 |
| CN | 108647681 A | 10/2018 |
| CN | 109447234 A | 3/2019 |
| CN | 109657629 A | 4/2019 |
| CN | 110135411 A | 8/2019 |
| CN | 110531860 A | 12/2019 |
| CN | 110598671 A | 12/2019 |
| CN | 110647274 A | 1/2020 |
| CN | 110825469 A | 2/2020 |
| DE | 3837590 A1 | 5/1990 |
| DE | 19841541 B4 | 12/2007 |
| DE | 102008024258 A1 | 11/2009 |
| DE | 202016008226 U1 | 5/2017 |
| EP | 59880 A2 | 9/1982 |
| EP | 138061 A1 | 4/1985 |

(56) References Cited

FOREIGN PATENT DOCUMENTS

| | | |
|---|---|---|
| EP | 140777 A1 | 5/1985 |
| EP | 218859 A2 | 4/1987 |
| EP | 262938 A1 | 4/1988 |
| EP | 138061 B1 | 6/1988 |
| EP | 293259 A2 | 11/1988 |
| EP | 299572 A2 | 1/1989 |
| EP | 313975 A2 | 5/1989 |
| EP | 314908 A2 | 5/1989 |
| EP | 327408 A2 | 8/1989 |
| EP | 389271 A2 | 9/1990 |
| EP | 411675 A2 | 2/1991 |
| EP | 534410 A2 | 3/1993 |
| EP | 559349 A1 | 9/1993 |
| EP | 570660 A1 | 11/1993 |
| EP | 863453 A1 | 9/1998 |
| EP | 559349 B1 | 1/1999 |
| EP | 1094406 A2 | 4/2001 |
| EP | 1245023 A1 | 10/2002 |
| EP | 1291848 A2 | 3/2003 |
| EP | 1368961 A2 | 12/2003 |
| EP | 1739546 A2 | 1/2007 |
| EP | 1892700 A1 | 2/2008 |
| EP | 1912205 A2 | 4/2008 |
| EP | 1939860 A1 | 7/2008 |
| EP | 1944997 A2 | 7/2008 |
| EP | 651543 B1 | 9/2008 |
| EP | 1909263 B1 | 1/2009 |
| EP | 1335620 B1 | 3/2009 |
| EP | 2069895 A1 | 6/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 2144226 A1 | 1/2010 |
| EP | 2168399 A1 | 3/2010 |
| EP | 1720375 B1 | 7/2010 |
| EP | 2205010 A1 | 7/2010 |
| EP | 2250640 A1 | 11/2010 |
| EP | 2309491 A1 | 4/2011 |
| EP | 2329348 | 6/2011 |
| EP | 2339576 A2 | 6/2011 |
| EP | 2355093 A2 | 8/2011 |
| EP | 2393056 A1 | 12/2011 |
| EP | 2400373 A1 | 12/2011 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2781883 A2 | 9/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2985984 A2 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3115905 A1 | 1/2017 |
| EP | 3125097 A2 | 2/2017 |
| EP | 3224708 A1 | 10/2017 |
| EP | 3246916 A1 | 11/2017 |
| EP | 3300074 A1 | 3/2018 |
| EP | 2983065 B1 | 8/2018 |
| EP | 3392876 A1 | 10/2018 |
| EP | 3401773 A1 | 11/2018 |
| EP | 3506151 A1 | 7/2019 |
| FR | 2911201 A1 | 7/2008 |
| GB | 2293667 A | 4/1996 |
| GB | 2343285 A | 5/2000 |
| GB | 2445436 A | 7/2008 |
| GB | 2445667 A | 7/2008 |
| GB | 2470585 A1 | 12/2010 |
| JP | 62-153326 A | 7/1987 |
| JP | 1-254742 A | 10/1989 |
| JP | 6-19965 A | 1/1994 |
| JP | 11-265400 A | 9/1999 |
| JP | 2000-272349 A | 10/2000 |
| JP | 2001-34290 A | 2/2001 |
| JP | 2001-125896 A | 5/2001 |
| JP | 2002-24212 A | 1/2002 |
| JP | 2003-517158 A | 5/2003 |
| JP | 2003-244317 A | 8/2003 |
| JP | 2003-288356 A | 10/2003 |
| JP | 2004-54080 A | 2/2004 |
| JP | 2004-505322 A | 2/2004 |
| JP | 2005-149481 A | 6/2005 |
| JP | 2005-332212 A | 12/2005 |
| JP | 2006-31092 A | 2/2006 |
| JP | 2006-80617 A | 3/2006 |
| JP | 2007-53796 A | 3/2007 |
| JP | 2007-299352 A | 11/2007 |
| JP | 2008-9120 A | 1/2008 |
| JP | 2008-21002 A | 1/2008 |
| JP | 2008-26381 A | 2/2008 |
| JP | 2008-39928 A | 2/2008 |
| JP | 2008-58813 A | 3/2008 |
| JP | 2008-64687 A | 3/2008 |
| JP | 2008-90545 A | 4/2008 |
| JP | 2008-97003 A | 4/2008 |
| JP | 2008-134949 A | 6/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |
| JP | 2008-269480 A | 11/2008 |
| JP | 2008-271481 A | 11/2008 |
| JP | 2008-275731 A | 11/2008 |
| JP | 2008-299221 A | 12/2008 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-69062 A | 4/2009 |
| JP | 2009-98490 A | 5/2009 |
| JP | 2009-110300 A | 5/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |

(56) References Cited

FOREIGN PATENT DOCUMENTS

| | | |
|---|---|---|
| JP | 2009-223840 A | 10/2009 |
| JP | 2009-294913 A | 12/2009 |
| JP | 2009-294946 A | 12/2009 |
| JP | 2010-66519 A | 3/2010 |
| JP | 2010-78602 A | 4/2010 |
| JP | 2010-78979 A | 4/2010 |
| JP | 2010-108378 A | 5/2010 |
| JP | 2010-109789 A | 5/2010 |
| JP | 2010-518475 A | 5/2010 |
| JP | 2010-518526 A | 5/2010 |
| JP | 2010-122928 A | 6/2010 |
| JP | 2010-135976 A | 6/2010 |
| JP | 2010-146347 A | 7/2010 |
| JP | 2010-157207 A | 7/2010 |
| JP | 2010-166478 A | 7/2010 |
| JP | 2010-205111 A | 9/2010 |
| JP | 2010-224236 A | 10/2010 |
| JP | 2010-236858 A | 10/2010 |
| JP | 4563106 B2 | 10/2010 |
| JP | 2010-256392 A | 11/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-237621 A | 11/2011 |
| JP | 2011-238022 A | 11/2011 |
| JP | 2011-250027 A | 12/2011 |
| JP | 2012-014394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-63536 A | 3/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-518847 A | 8/2012 |
| JP | 2012-211932 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2013-258600 A | 12/2013 |
| JP | 2014-2586 A | 1/2014 |
| JP | 2014-10688 A | 1/2014 |
| JP | 20145-2445 A | 1/2014 |
| JP | 2014-026629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-077969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-191272 A | 10/2014 |
| JP | 2014-219614 A | 11/2014 |
| JP | 2014-222514 A | 11/2014 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-536648 A | 11/2016 |
| JP | 2017-19331 A | 1/2017 |
| JP | 2017-516153 A | 6/2017 |
| JP | 2017-537361 A | 12/2017 |
| JP | 6291147 B1 | 2/2018 |
| JP | 2018-525950 A | 9/2018 |
| KR | 2002-0064149 A | 8/2002 |
| KR | 10-2006-0091469 A | 8/2006 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0033070 A | 4/2008 |
| KR | 10-0819928 B1 | 4/2008 |
| KR | 10-2008-0049647 A | 6/2008 |
| KR | 10-2008-0059332 A | 6/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0005937 A | 1/2011 |
| KR | 10-2011-0013625 A | 2/2011 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |

(56) References Cited

FOREIGN PATENT DOCUMENTS

| | | |
|---|---|---|
| KR | 10-2012-0066523 A | 6/2012 |
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0024271 A | 2/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0068752 A | 6/2014 |
| KR | 10-2014-0088449 A | 7/2014 |
| KR | 10-2014-0106715 A | 9/2014 |
| KR | 10-2014-0147557 A | 12/2014 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-2015-0095624 A | 8/2015 |
| KR | 10-1555742 B1 | 9/2015 |
| KR | 10-2015-0113127 A | 10/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101198 A | 8/2016 |
| KR | 10-2016-0105847 A | 9/2016 |
| KR | 10-2016-0121585 A | 10/2016 |
| KR | 10-2016-0140694 A | 12/2016 |
| KR | 10-2017-0036805 A | 4/2017 |
| KR | 10-2017-0107058 A | 9/2017 |
| KR | 10-2018-0032632 A | 3/2018 |
| KR | 10-2018-0034637 A | 4/2018 |
| RU | 2349970 C2 | 3/2009 |
| RU | 2353068 C2 | 4/2009 |
| RU | 2364917 C2 | 8/2009 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |
| TW | 201227715 A1 | 7/2012 |
| TW | 201245989 A1 | 11/2012 |
| TW | 201312548 A1 | 3/2013 |
| WO | 1995/002221 A1 | 1/1995 |
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/060435 A2 | 10/2000 |
| WO | 2000/060435 A3 | 10/2000 |
| WO | 2002/010900 A2 | 2/2002 |
| WO | 2002/073603 A1 | 9/2002 |
| WO | 2006/084144 A2 | 8/2006 |
| WO | 2006/129967 A1 | 12/2006 |
| WO | 2008/030970 A2 | 3/2008 |
| WO | 2008/071231 A1 | 6/2008 |
| WO | 2008/085742 A2 | 7/2008 |
| WO | 2008/098900 A2 | 8/2008 |
| WO | 2008/109835 A2 | 8/2008 |
| WO | 2008/120036 A1 | 10/2008 |
| WO | 2008/130095 A1 | 10/2008 |
| WO | 2008/140236 A1 | 11/2008 |
| WO | 2008/142472 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/013369 A1 | 2/2010 |
| WO | 2010/054373 A2 | 5/2010 |
| WO | 2010/075623 A1 | 7/2010 |
| WO | 2010/100937 A1 | 9/2010 |
| WO | 2010/141802 A1 | 12/2010 |
| WO | 2010/144651 A2 | 12/2010 |
| WO | 2011/028842 A2 | 3/2011 |
| WO | 2011/057346 A1 | 5/2011 |
| WO | 2011/060106 A1 | 5/2011 |
| WO | 2011/082521 A1 | 7/2011 |
| WO | 2011/088053 A2 | 7/2011 |
| WO | 2011/093025 A1 | 8/2011 |
| WO | 2011/100142 A2 | 8/2011 |
| WO | 2011/116309 A1 | 9/2011 |
| WO | 2011/123122 A1 | 10/2011 |
| WO | 2011/133543 A1 | 10/2011 |
| WO | 2011/133573 A2 | 10/2011 |
| WO | 2011/097309 A3 | 12/2011 |
| WO | 2011/150730 A1 | 12/2011 |
| WO | 2011/163350 A1 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/063260 A2 | 5/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/122310 A1 | 8/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/047047 A1 | 3/2014 |
| WO | 2014/066352 A1 | 5/2014 |

(56) References Cited

FOREIGN PATENT DOCUMENTS

| | | |
|---|---|---|
| WO | 2014/070872 A2 | 5/2014 |
| WO | 2014/078965 A1 | 5/2014 |
| WO | 2014/093339 A1 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/116151 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/213682 A1 | 12/2017 |
| WO | 2018/009397 A1 | 1/2018 |
| WO | 2018/213401 A1 | 11/2018 |
| WO | 2018/213415 A1 | 11/2018 |
| WO | 2019/067930 A1 | 4/2019 |
| WO | 2019/078576 A1 | 4/2019 |
| WO | 2019/079017 A1 | 4/2019 |
| WO | 2019/147429 A1 | 8/2019 |
| WO | 2019/236217 A1 | 12/2019 |
| WO | 2020/010530 A1 | 1/2020 |

OTHER PUBLICATIONS

Android Authority, "Howto use Tasker: A Beginner's Guide", Online available at:—<https://youtube.com/watch?v= rDpdS_YWzFc>, May 1, 2013, 1 page.

Ashbrook, Daniel L., "Enabling Mobile Microinteractions", May 2010, 186 pages.

Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.

Automate Your Life, "How to Setup Googie Home Routines—A Googie Home Routines Waikthrough", Oniine Available at: <https://www.youtube.com/watch?v=pXokZHP9kZg>, Aug. 12, 2018, 1 page.

Bell, Jason, "Machine Learning Hands-On for Developers and Technical Professionals", Wiley, 2014, 82 pages.

Bellegarda, Jeromer, "Chapter 1: Spoken Language Understanding for Natural Interaction: The Siri Experience", Natural Interaction with Robots, Knowbots and Smartphones, 2014, pp. 3-14.

Bellegarda, Jeromer, "Spoken Language Understanding for Natural Interaction The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.

beointegration.com, "BeoLink Gateway—Programming Example", Online Available at: <https://www.youtube.com/watch?v=TXDaJFm5UH4>, Mar. 4, 2015, 3 pages.

Burgess, Brian, "Amazon Echo Tip: Enable the Wake Up Sound", Online available at:- <https://www.groovypost.com/howto/amazon-echo-tip-enable-wake-up-sound/>, Jun. 30, 2015, 4 pages.

Cambria et al., "Jumping NLP curves: A Review of Natural Language Processing Research.", IEEE Computational Intelligence magazine, 2014, vol. 9, May 2014, pp. 48-57.

Chang et al., "Monaural Multi-Talker Speech Recognition with Attention Mechanism and Gated Convolutional Networks", Interspeech 2018, Sep. 2-6, 2018, pp. 1586-1590.

Chen, Yi, "Multimedia Siri Finds and Plays Whatever You Ask For", PSFK Report, Feb. 9, 2012, pp. 1-9.

Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.

Coulouris et al., "Distributed Systems: Concepts and Design (Fifth Edition)", Addison-Wesley, 2012, 391 pages.

Czech Lucas, "A System for Recognizing Natural Spelling of English Words", Diploma Thesis, Karlsruhe Institute of Technology, May 7, 2014, 107 pages.

Delcroix et al., "Context Adaptive Deep Neural Networks For Fast Acoustic Model Adaptation", ICASSP, 2015, pp. 4535-4539.

Delcroix et al., "Context Adaptive Neural Network for Rapid Adaptation of Deep CNN Based Acoustic Models", Interspeech 2016, Sep. 8-12, 2016, pp. 1573-1577.

Derrick, Amanda, "How to Set Up Googfe Home for Multiple Users", Lifewire, Online availabfe at:—<https://www.lifewire.com/set-up-google-home-multiple-users-4685691>, Jun. 8, 2020, 9 pages.

Detroitborg, "Apple Remote App (iPhone & iPod Touch): Tutorial and Demo", Online Available at:—<https://www.youtube.com/watch?v=M_jzeEevKql>, Oct. 13, 2010, 4 pages.

(56) References Cited

OTHER PUBLICATIONS

Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
Earthling1984, "Samsung Galaxy Smart Stay Feature Explained", Online available at:—<https://www.youtube.com/watch?v=RpjBNtSjupI>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Gasic et al., "Effective Handling of Dialogue State in the Hidden Information State POMDP-based Dialogue Manager", ACM Transactions on Speech and Language Processing, May 2011, pp. 1-25.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Google Developers,"Voice search in your app", Online available at:—<https://www.youtube.com/watch?v=PS1FbB5qWEI>, Nov. 12, 2014, 1 page.
Gupta et al., "I-vector-based Speaker Adaptation of Deep Neural Networks For French Broadcast Audio Transcription", ICASSP, 2014, 2014, pp. 6334-6338.
Gupta, Naresh, "Inside Bluetooth Low Energy", Artech House, 2013, 274 pages.
Hershey et al., "Deep Clustering: Discriminative Embeddings For Segmentation And Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How To Enable Google Assistant on Galaxy 87 and Other Android Phones (No Root)", Online available at:—<https://www.youtube.com/watch?v=HekIQbWyksE>, March 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One For Dummies", 3rd Edition, 2013, 98 pages.
Ikeda, Masaru, "beGlobal Seoul 2015 Startup Battle: Talkey", YouTube Publisher, Online Available at:—<https://www.youtube.com/watch?v=4Wkp7sAAIdg>, May 14, 2015, 1 page.
Inews and Tech,"How To Use The QuickType Keyboard In IOS 8", Online available at:—<http://www.inewsandtech.com/how-to-use-the-quicktype-keyboard-in-ios-8/>, Sep. 17, 2014, 6 pages.
Internet Services and Social Net, "How to Search for Similar Websites", Online availabe at:—<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new Al bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Lee, Sungjin, "Structured Discriminative Model For Dialog State Tracking", Proceedings of the SIGDIAL 2013 Conference, Aug. 22-24, 2013, pp. 442-451.
"Link Your Voice to Your Devices with Voice Match, Google Assistant Help", Online available at:—<https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et at., "What Is the internet of Things?", O'Reiliy Media, Inc., Ontine Avaifable at: <https://www.oreilly.com/fibrary/view/What-is-the/9781491975633/>, 2015, 31 pages.
Luo et al., "Speaker-Independent Speech Separation With Deep Attractor Network", IEEE/ACM Transactions On Audio, Speech, And Language Processing, vol. 26, No. 4, Apr. 2018, pp. 787-796.
Malcangi Mario, "Text-driven Avatars Based on Artificial Neural Networks and Fuzzy Logic", International Journal of Computers, vol. 4, No. 2, Dec. 31, 2010, pp. 61-69.
Marketing Land,"Amazon Echo: Play music", Online Available at:—<https://www.youtube.com/watch?v=A7V5NPbsXi4>, Apr. 27, 2015, 3 pages.
Mikolov et al., "Linguistic Regularities in Continuous Space Word Representations", Proceedings of NAACL-HLT, Jun. 9-14, 2013, pp. 746-751.
Modern Techies,"Braina-Artificial Personal Assistant for PC(like Cortana,Siri)!!!!", Online available at: <https://www.youtube.com/watch?v=_Coo2P8ilqQ>, Feb. 24, 2017, 3 pages.
Nakamura et al., "Realization of a Browser to Filter Spoilers Dynamically", vol. No. 67, 2010, 8 pages (Official Copy Only). {See communication under 37 CFR § 1.98(a) (3)}.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Nakamura Satoshi, "Antispoiler: An Web Browser to Filter Spoiler", vol. 2010-HCL-139 No.17, Online available at:—<https://ipsj.ixsq.nii.ac.jp/ej/index.php?active_action=repository_view_main_item_detail& page_id=13&block_id=8&item_id=70067&item_no=1>, Jul. 31, 2010, 8 pages (Official Copy Only). {See communication under 37 CFR § 1.98(a) (3)}.
Pak, Gamerz, "Braina: Artificially Intelligent Assistant Software for Windows PC in Kurdu / hindhi)", Online available at: <https://www.youtube.com/watch?v=JH_rMjw8lqc>, Jul. 24, 2018, 3 pages.
PC MAG, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Oniine Available at: <https://www.youtube.com/watch?v=nSkSuXziJSg>, Apr. 11, 2016, 3 pages.
"Phoenix Solutions, Inc. v. West Interactive Corp.", Document 40, Declaration of Christopher Schmandt Regarding the MIT Galaxy System, Jul. 2, 2010, 162 pages.
pocketables.com,"AutoRemote example profile", Online available at https://www.youtube.com/watch?v=kC_zhUnNZj8, Jun. 25, 2013, 1 page.
Qian et al., "Single-channel Multi-talker Speech Recognition With Permutation Invariant Training", Speech Communication, Issue 104, 2018, pp. 1-11.

(56) References Cited

OTHER PUBLICATIONS

"Quick Type Keyboard on iOS 8 Makes Typing Easier", Online available at: -Khttps://www.youtube.com/watch?v=OCIdLR4fhVU>, Jun. 3, 2014, 3 pages.
Rasch, Katharina, "Smart Assistants for Smart Homes", Doctoral Thesis in Electronic and Computer Systems, 2013, 150 pages.
Ritchie, Rene, "QuickType keyboard in iOS 8: Explained", Online Available at: -Khttps://www.imore.com/quicktype-keyboards-ios-8-explained>, Jun. 21, 2014, pp. 1-19.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at: -Khttps://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at:-Khttps://productforums.google.eom/forum/#!topic/websearch/lp3qlGBHLVI>, Mar. 8, 2017, 4 pages.
Senior et al., "Improving DNN Speaker Independence With l-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Siou, Serge, "How to Control Apple TV 3rd Generation Using Remote app", Online available at: <https://www.youtube.com/watch?v=PhyKftZOS9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
Smith, Jake, "Amazon Alexa Calling: How to Set it up and Use it on Your Echo", iGeneration, May 30, 2017, 5 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Tan et al., "Knowledge Transfer In Permutation Invariant Training For Single-channel Multi-talker Speech Recognition", ICASSP 2018, 2018, pp. 5714-5718.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy Only) {See communication under 37 CFR § 1.98(a) (3)}.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions On Audio, Speech, And Language Processing, vol. 23, No. 10, Oct. 2015, pp. 1670-1679.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
Xu et al., "Policy Optimization of Dialogue Management in Spoken Dialogue System For Out-of-Domain Utterances", 2016 International Conference On Asian Language Processing (IALP), IEEE, Nov. 21, 2016, pp. 10-13.
Yang Astor, "Control Android TV via Mobile Phone APP RKRemoteControl", Online Available at:—<https://www.youtube.com/watch?v=zpmUeOX_xro>, Mar. 31, 2015, 4 pages.
Yates, Michael C., "How Can I Exit Google Assistant After I'm Finished with it", Available online at:—<https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page (Official Copy Only). {See communication under 37 CFR § 1.98(a) (3)}.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training Of Deep Models For Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhan et al., "Play with Android Phones", Feb. 29, 2012, 1 page (Official Copy Only). {See communication under 37 CFR § 1.98(a) (3)}.
Zmolikova et al., "Speaker-Aware Neural Network Based Beamformer For Speaker Extraction In Speech Mixtures", Interspeech 2017, Aug. 20-24, 2017, pp. 2655-2659.
Acero et al., "Environmental Robustness in Automatic Speech Recognition", International Conference on Acoustics, Speech and Signal Processing (ICASSP'90), Apr. 1990, 4 pages.
Acero et al., "Robust Speech Recognition by Normalization of the Acoustic Space", International Conference on Acoustics, Speech and Signal Processing, 1991, 4 pages.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Agnas et al., "Spoken Language Translator: First-Year Report", SICS (ISSN 0283-3638), SRI and Telia Research AB, Jan. 1994, 161 pages.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.
Aikawa et al., "Speech Recognition Using Time-Warping Neural Networks", Proceedings of the 1991, IEEE Workshop on Neural Networks for Signal Processing, 1991, 10 pages.
"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.
Alfred App, "Alfred", available at <http://www.alfredapp.com/>, retrieved on Feb. 8, 2012, 5 pages.
Allen, J., "Natural Language Understanding", 2nd Edition, The Benjamin/Cummings Publishing Company, Inc., 1995, 671 pages.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.

(56) References Cited

OTHER PUBLICATIONS

Alshawi et al., "Overview of the Core Language Engine", Proceedings of Future Generation Computing Systems,Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Anania, Peter, "Amazon Echo with Home Automation (Smartthings)", Available online at https://www.youtube.com/watch?v=LMW6aXmsWNE, Dec. 20, 2015, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
API.AI, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple, "VoiceOver", available at <http://www.apple.com/accessibility/voiceover/>, May 19, 2014, 3 pages.
Archbold et al., "A Team User's Guide", SRI International, Dec. 21, 1981, 70 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.
Atal et al., "Efficient Coding of LPC Parameters by Temporal Decomposition", IEEE International Conference on Acoustics, Speech and Signal Processing (ICASSP'83), Apr. 1983, 4 pages.

Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", SIGNAL PROCESSING VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.

(56) References Cited

OTHER PUBLICATIONS

Bellegarda, Jerome R., "Interaction-Driven Speech Input-A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", Proceedings of the First International Conference on Human Language Technology Research, Paper, 2001, 5 pages.
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Bertulucci, Jeff, "Google Adds Voice Search to Chrome Browser", PC World, Jun. 14, 2011, 5 pages.
Black et al., "Automatically Clustering Similar Units for Unit Selection in Speech Synthesis", Proceedings of Eurospeech, vol. 2, 1997, 4 pages.
Blair et al., "An Evaluation of Retrieval Effectiveness fora Full-Text Document-Retrieval System", Communications of the ACM, vol. 28, No. 3, Mar. 1985, 11 pages.
Bobrow et al., "Knowledge Representation for Syntactic/Semantic Processing", From: AAA-80 Proceedings, Copyright 1980, AAAI, 1980, 8 pages.
Bocchieri et al., "Use of Geographical Meta-Data in ASR Language and Acoustic Models", IEEE International Conference on Acoustics Speech and Signal Processing, 2010, pp. 5118-5121.
Bouchou et al., "Using Transducers in Natural Language Database Query", Proceedings of 4th International Conference on Applications of Natural Language to Information Systems, Austria, Jun. 1999, 17 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Bussey, et al., "Service Architecture, Prototype Description and Network Implications of a Personalized Information Grazing Service", INFOCQM'90, Ninth Annual Joint Conference of the IEEE Computerand Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech and Signal Processing, vol. Assp-28, No. 5, Oct. 1980, 13 pages.
Caminero-Gil et al., "Data-Driven Discourse Modeling for Semantic Interpretation", Proceedings of the IEEE International Conference on Acoustics, Speech and Signal Processing, May 1996, 6 pages.
Caraballo et al., "Language Identification Based on a Discriminative Text Categorization Technique", Iberspeech 2012—Vii Jornadas En Tecnologia Del Habla And Iii Iberiansl Tech Workshop, Nov. 21, 2012, pp. 1-10.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.
Castleos, "Whole House Voice Control Demonstration", available online at https://www.youtube.com/watch?v=9SRCoxrZ_W4, Jun. 2, 2012, 26 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chen et al., "An Improved Method For Image Retrieval Using Speech Annotation", The 9th International Conference on Multi-Media Modeling, Jan. 2003, pp. 1-17.
Chen, Yi, "Multimedia Siri Finds and Plays Whatever You Ask For", PSFK Report, Feb. 9, 2012, 9 pages.
Cheyer et al., "Demonstration Video of Multimodal Maps Using an Agent Architecture", published by SRI International No. later than 1996, as depicted in Exemplary Screenshots from video entitled 'Demonstration Video of Multimodal Maps Using an Agent Architecture, 1996, 6 pages.
Cheyer et al., "Demonstration Video of Multimodal Maps Using an Open—Agent Architecture", published by SRI International No. later than 1996, as depicted in Exemplary Screenshots from video entitled 'Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Codd, E. F., "Databases: Improving Usability and Responsiveness-How About Recently", Copyright 1978, Academic Press, Inc., 1978, 28 pages.

(56) References Cited

OTHER PUBLICATIONS

Cohen et al., "An Open Agent Architecture", available at <http://citeseerx.ist.psu.edu/viewdoc/summary?doi=1 0.1.1.30.480>, 1994, 8 pages.

Coles et al., "Chemistry Question-Answering", SRI International, Jun. 1969, 15 pages.

Coles et al., "Techniques for Information Retrieval Using an Inferential Question-Answering System with Natural-Language Input", SRI International, Nov. 1972, 198 Pages.

Coles et al., "The Application of Theorem Proving to Information Retrieval", SRI International, Jan. 1971, 21 pages.

Colt, Sam, "Here's One Way Apple's Smartwatch Could Be Better Than Anything Else", Business Insider, Aug. 21, 2014, pp. 1-4.

Conklin, Jeff, "Hypertext: An Introduction and Survey", Computer Magazine, Sep. 1987, 25 pages.

Connolly et al., "Fast Algorithms for Complex Matrix Multiplication Using Surrogates", IEEE Transactions on Acoustics, Speech and Signal Processing, vol. 37, No. 6, Jun. 1989, 13 pages.

Constantinides et al., "A Schema Based Approach to Dialog Control", Proceedings of the International Conference on Spoken Language Processing, 1998, 4 pages.

Cox et al., "Speech and Language Processing for Next-Millennium Communications Services", Proceedings of the IEEE, vol. 88, No. 8, Aug. 2000, 24 pages.

Craig et al., "Deacon: Direct English Access and Control", AFIPS Conference Proceedings, vol. 19, San Francisco, Nov. 1966, 18 pages.

Cutkosky et al., "PACT: An Experiment in Integrating Concurrent Engineering Systems", Journal & Magazines, Computer, vol. 26, No. 1, Jan. 1993, 14 pages.

Dar et al., "DTL's DataSpot: Database Exploration Using Plain Language", Proceedings of the 24th VLDB Conference, New York, 1998, 5 pages.

Database WPI Section Ch, Week 8733, Derwent Publications Ltd., London, GB; Class A17, AN 87-230826 & JP, A, 62 153 326 (Sanwa Kako KK (SANS) Sanwa Kako Co), Jul. 8, 1987, 6 pages.

Database WPI Section Ch, Week 8947, Derwent Publications Ltd., London, GB Class A17, AN 89-343299 & JP, A, 1 254 742 (Sekisui Plastics KK), Oct. 11, 1989, 7 pages.

Davis et al., "A Personal Handheld Multi-Modal Shopping Assistant", International Conference on Networking and Services, IEEE, 2006, 9 pages.

Decker et al., "Designing Behaviors for Information Agents", The Robotics Institute, Carnegie-Mellon University, Paper, Jul. 1996, 15 pages.

Decker et al., "Matchmaking and Brokering", The Robotics Institute, Carnegie-Mellon University, Paper, May 1996, 19 pages.

Deedeevuu, "Amazon Echo Alarm Feature", Available online at https://www.youtube.com/watch?v=fdjU8eRLk7c, Feb. 16, 2015, 1 page.

Deerwester et al., "Indexing by Latent Semantic Analysis", Journal of the American Society for Information Science, vol. 41, No. 6, Sep. 1990, 19 pages.

Deller, Jr. et al., "Discrete-Time Processing of Speech Signals", Prentice Hall, ISBN: 0-02-328301-7, 1987, 14 pages.

Digital Equipment Corporation, "Open VMS Software Overview", Software Manual, Dec. 1995, 159 pages.

"DIRECTV™ Voice", Now Part of the DIRECTTV Mobile App for Phones, Sep. 18, 2013, 5 pages.

Dittenbach et al., "A Natural Language Query Interface for Tourism Information", In: Information and Communication Technologies in Tourism 2003, XP055114393, Feb. 14, 2003, pp. 152-162.

Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.

Donovan, R. E., "A New Distance Measure for Costing Spectral Discontinuities in Concatenative Speech Synthesisers", available at <http://citeseerx.ist.osu.edu/viewdoc/summary?doi=1 0.1.1.21. 6398>, 2001, 4 pages.

Dowding et al., "Gemini: A Natural Language System for Spoken-Language Understanding", Proceedings of the Thirty-First Annual Meeting of the Association for Computational Linguistics, 1993, 8 pages.

Dowding et al., "Interleaving Syntax and Semantics in An Efficient Bottom-Up Parser", Proceedings of the 32nd Annual Meeting of the Association for Computational Linguistics, 1994, 7 pages.

Dragon Naturally Speaking Version 11 Users Guide, Nuance Communications, Inc., Copyright @2002-2010, 132 pages.

Elio et al., "On Abstract Task Models and Conversation Policies", Proc. Workshop on Specifying and Implementing Conversation Policies, Autonomous Agents'99 Conference, 1999, pp. 1-10.

Elliott et al., "Annotation Suggestion and Search for Personal Multimedia Objects on the Web", CIVR, Jul. 7-9, 2008, pp. 75-84.

Epstein et al., "Natural Language Access to a Melanoma Data Base", SRI International, Sep. 1978, 7 pages.

Ericsson et al., "Software Illustrating a Unified Approach to Multimodality and Multilinguality in the In-Home Domain", Talk and Look: Tools for Ambient Linguistic Knowledge, Dec. 2006, 127 pages.

Erol et al., "Multimedia Clip Generation From Documents for Browsing on Mobile Devices", IEEE Transactions on Multimedia, vol. 10, No. 5, Aug. 2008, 13 pages.

European Search Report received for European Patent Application No. 01201774.5, dated Sep. 14, 2001, 3 pages.

European Search Report received for European Patent Application No. 99107544.1, dated Jul. 8, 1999, 4 pages.

European Search Report received for European Patent Application No. 99107545.8, dated Jul. 1, 1999, 3 pages.

Evi, "Meet Evi: The One Mobile Application that Provides Solutions for your Everyday Problems", Feb. 2012, 3 pages.

Ex Parte Quayle Action received for U.S. Appl. No. 12/244,713, dated Sep. 10, 2012, 5 pages.

Exhibit 1, "Natural Language Interface Using Constrained Intermediate Dictionary of Results", List of Publications Manually Reviewed for the Search of U.S. Pat. No. 7,177,798, Mar. 22, 2013, 1 page.

Extended European Search Report (includes Partial European Search Report and European Search Opinion) received for European Patent Application No. 15169349.6, dated Jul. 28, 2015, 8 pages.

Extended European Search Report received for European Patent Application No. 11159884.3, dated May 20, 2011, 8 pages.

Feigenbaum et al., "Computer-Assisted Semantic Annotation of Scientific Life Works", Oct. 15, 2007, 22 pages.

Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.

Fikes et al., "A Network-Based Knowledge Representation and its Natural Deduction System", SRI International, Jul. 1977, 43 pages.

Filipowicz, Luke, "How to use the Quick Type Keyboard in iOS 8", available online at <https://www.imore.com/comment/568232>, Oct. 11, 2014, pp. 1-17.

Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.

Finkel et al., "Joint Parsing and Named Entity Recognition", Human Language Technologies: The 2009 Annual Conference of the North American Chapter of the ACL, Jun. 2009, pp. 326-334.

Frisse, M. E., "Searching for Information in a Hypertext Medical Handbook", Communications of the ACM, vol. 31, No. 7, Jul. 1988, 8 pages.

Gamback et al., "The Swedish Core Language Engine", NOTEX Conference, 1992, 17 pages.

Gannes, Liz, "Alfred App Gives Personalized Restaurant Recommendations", AllThingsD, Jul. 18, 2011, pp. 1-3.

Gautier et al., "Generating Explanations of Device Behavior Using Compositional Modeling and Causal Ordering", CiteSeerx, 1993, pp. 89-97.

Gervasio et al., "Active Preference Learning for Personalized Calendar Scheduling Assistance", CiteSeerx, Proceedings of IUI'05, Jan. 2005, pp. 90-97.

(56) References Cited

OTHER PUBLICATIONS

Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Goddeau et al., "A Form-Based Dialogue Manager for Spoken Language Applications", Available online at <http://phasedance.com/pdflicslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gomez et al., "Mouth Gesture and Voice Command Based Robot Command Interface", IEEE International Conference on Robotics and Automation, May 12-17, 2009, pp. 333-338.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Gregg et al., "DSS Access on the WWW: An Intelligent Agent Prototype", Proceedings of the Americas Conference on Information Systems, Association for Information Systems, 1998, 3 pages.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz et al., "TEAM: An Experiment in the Design of Transportable Natural-Language Interfaces", Artificial Intelligence, vol. 32, 1987, 71 pages.
Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, 1993, pp. 907-928.
Gruber, Thomas R., et al., U.S. Appl. No. 61/186,414, filed Jun. 12, 2009 titled "System and Method for Semantic Auto-Completion" 13 pages (Copy Not Attached).
Gruber, Tom, "(Avoiding) The Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement-Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Gurevych et al., "Semantic Coherence Scoring Using an Ontology", North American Chapter of the Association for Computational

(56) References Cited

OTHER PUBLICATIONS

Linguistics Archive, Proceedings of the 2003 Conference of the North American Chapter of the Association for Computational Linguistics on Human Language Technology, May 27, 2003, 8 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Haga et al., "A Usability Survey of a Contents-Based Video Retrieval System by Combining Digital Video and an Electronic Bulletin Board", The Internet and Higher Education, vol. 8, No. 3, 2005, pp. 251-262.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Headset Button Controller v7.3 APK Full APP Download for Android, Blackberry, iPhone, Jan. 27, 2014, 11 pages.
Hear voice from Google translate, Available on URL:https://www.youtube.com/watch?v=18AvMhFqD28, Jan. 28, 2011, 1 page.
Helm et al., "Building Visual Language Parsers", Proceedings of CHI'91, Proceedings of the SIGCHI Conference on Human Factors in Computing Systems, 1991, 8 pages.
Hendrix et al., "Developing a Natural Language Interface to Complex Data", ACM Transactions on Database Systems, vol. 3, No. 2, Jun. 1978, pp. 105-147.
Hendrix et al., "Transportable Natural-Language Interfaces to Databases", SRI International, Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Huang et al., "The SPHINX-II Speech Recognition System: An Overview", Computer, Speech and Language, vol. 7, No. 2, 1993, 14 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
id3.org, "id3v2.4.0-Frames", available at <http://id3.org/id3v2.4.0-frames?action=print>, retrieved on Jan. 22, 2015, 41 pages.
Interactive Voice, available at <http://www.helloivee.com/company/>, retrieved on Feb. 10, 2014, 2 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Preliminary Report on Patentability received for PCT Patent Application No. PCT/US1994/011011, dated Feb. 28, 1996, 4 pages.
International Preliminary Report on Patentability received for PCT Patent Application No. PCT/US1995/008369, dated Oct. 9, 1996, 4 pages.
International Preliminary Report on Patentability received for PCT Patent Application No. PCT/US2004/002873, dated Feb. 1, 2006, 5 pages.
International Preliminary report on Patentability received for PCT Patent Application No. PCT/US2004/016519, dated Jan. 23, 2006, 12 pages.
International Preliminary Report on Patentability received for PCT Patent Application No. PCT/US2008/000042, dated Jul. 7, 2009, 6 pages.

(56) References Cited

OTHER PUBLICATIONS

International Preliminary Report on Patentability received for PCT Patent Application No. PCT/US2008/000043, dated Jul. 7, 2009, 8 pages.
International Preliminary Report on Patentability received for PCT Patent Application No. PCT/US2008/000047, dated Jul. 7, 2009, 8 pages.
International Preliminary Report on Patentability received for PCT Patent Application No. PCT/US2010/037378, dated Dec. 6, 2011, 9 pages.
International Preliminary Report on Patentability received for PCT Patent Application No. PCT/US2011/020350, dated Jul. 17, 2012, 12 pages.
International Preliminary Report on Patentability received for PCT Patent Application No. PCT/US2011/020825, dated Jan. 13, 2012, 17 pages.
International Preliminary Report on Patentability received for PCT Patent Application No. PCT/US2011/037014, dated Dec. 13, 2012, 10 pages.
International Preliminary Report on Patentability received for PCT Patent Application No. PCT/US2012/034028, dated Oct. 31, 2013, 7 pages.
International Preliminary Report on Patentability received for PCT Patent Application No. PCT/US2012/040931, dated Dec. 18, 2014, 9 pages.
International Preliminary Report on Patentability received for PCT Patent Application No. PCT/US2012/043098, dated Jan. 9, 2014, 8 pages.
International Preliminary Report on Patentability received for PCT Patent Application No. PCT/US2012/043100, dated Jan. 9, 2014, 7 pages.
International Preliminary Report on Patentability received for PCT Patent Application No. PCT/US2013/044834, dated Dec. 9, 2014, 9 pages.
International Preliminary Report on Patentability received for PCT Patent Application No. PCT/US2013/047659, dated Dec. 31, 2014, 15 pages.
International Preliminary Report on Patentability received for PCT Patent Application No. PCT/US2014/015418, dated Aug. 20, 2015, 12 pages.
International Preliminary Report on Patentability received for PCT Patent Application No. PCT/US2014/016988, dated Sep. 3, 2015, 8 pages.
International Search Report and Written Opinion received for PCT Patent Application No. PCT/US1994/011011, dated Feb. 8, 1995, 3 pages (International Search Report only).
International Search Report and Written Opinion received for PCT Patent Application No. PCT/US2004/002873, dated Oct. 13, 2005, 7 pages.
International Search Report and Written Opinion received for PCT Patent Application No. PCT/US2011/020825, dated Mar. 18, 2011, 9 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2013/044574, dated Sep. 27, 2013, 12 pages.
International Search Report and Written Opinion received for PCT Patent Application No. PCT/US2013/044834, dated Dec. 20, 2013, 13 pages.
International Search Report and Written Opinion received for PCT Patent Application No. PCT/US2013/047659, dated Jul. 7, 2014, 25 pages.
International Search Report and Written Opinion received for PCT Patent Application No. PCT/US2014/016988, dated Apr. 29, 2014, 10 pages.
International Search Report and Written Opinion received for PCT Patent Application No. PCT/US2014/023826, dated Oct. 9, 2014, 13 pages.
International Search Report and Written Opinion received for PCT Patent Application No. PCT/US2014/026871, dated Jul. 23, 2014, 9 pages.
International Search Report and Written Opinion received for PCT Patent Application No. PCT/US2014/026873, dated Jan. 5, 2015, 11 pages.
International Search Report and Written Opinion received for PCT Patent Application No. PCT/US2014/028950, dated Nov. 25, 2014, 10 pages.
International Search Report and Written Opinion received for PCT Patent Application No. PCT/US2014/040393, dated Dec. 8, 2014, 23 pages.
International Search Report and Written Opinion received for PCT Patent Application No. PCT/US2014/040394, dated Aug. 8, 2014, 11 pages.
International Search Report and Written Opinion received for PCT Patent Application No. PCT/US2014/040397, dated Aug. 27, 2014, 12 pages.
International Search Report and Written Opinion received for PCT Patent Application No. PCT/US2015/023097, dated Jul. 7, 2015, 15 pages.
International Search Report and Written Opinion received for PCT Patent Application No. PCT/US2015/023593, dated Aug. 14, 2015, 16 pages.
International Search Report and Written Opinion received for PCT Patent Application No. PCT/US2015/033051, dated Aug. 5, 2015, 14 pages.
International Search Report received for PCT Patent Application No. PCT/US1993/012666, dated Nov. 9, 1994, 8 pages.
International Search Report received for PCT Patent Application No. PCT/US1994/000687, dated Jun. 3, 1994, 1 page.
International Search Report received for PCT Patent Application No. PCT/US1994/00077, dated May 25, 1994, 2 pages.
International Search Report received for PCT Patent Application No. PCT/US1995/008369, dated Nov. 8, 1995, 6 pages.
International Search Report received for PCT Patent Application No. PCT/US1995/013076, dated Feb. 2, 1996, 1 page.
International Search Report received for PCT Patent Application No. PCT/US1996/01002, dated Oct. 30, 1996, 4 pages.
International Search Report received for PCT Patent Application No. PCT/US2002/024669, dated Nov. 5, 2002, 3 pages.
International Search Report received for PCT Patent Application No. PCT/US2002/024670, dated Sep. 26, 2002, 3 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fees and Partial International Search Report received for PCT Patent Application No. PCT/US2015/023089, dated Jun. 17, 2015, 7 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jelinek, F., "Self-Organized Language Modeling for Speech Recognition", Readings in Speech Recognition, Edited by Alex Weibel and Kai-Fu Lee, Morgan Kaufmann Publishers, Inc., ISBN: 1-55860-124-4, 1990, 63 pages.
Jennings et al., "A Personal News Service Based on a User Model Neural Network", IEICE Transactions on Information and Systems, vol. E75-D, No. 2, Mar. 1992, 12 pages.

(56) References Cited

OTHER PUBLICATIONS

Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Jiang et al., "A Syllable-based Name Transliteration System", Proc. of the 2009 Named Entities Workshop, Aug. 7, 2009, pp. 96-99.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE,, 2012,, pp. 4821-4824.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kahn et al., "CoABS Grid Scalability Experiments", Autonomous Agents and Multi-Agent Systems, vol. 7, 2003, pp. 171-178.
Kamel et al., "A Graph Based Knowledge Retrieval System", IEEE International Conference on Systems, Man and Cybernetics, 1990, pp. 269-275.
Kane et al., "Slide Rule: Making Mobile Touch Screens Accessible to Blind People Using Multi-Touch Interaction Techniques", ASSETS, Oct. 13-15, 2008, pp. 73-80.
Karp, P. D., "A Generic Knowledge-Base Access Protocol", Available online at <http://lecture.cs.buu.ac.th/-f50353/Document/gfp.pdf>, May 12, 1994, 66 pages.
Katz et al., "Exploiting Lexical Regularities in Designing Natural Language Systems", Proceedings of the 12th International Conference on Computational Linguistics, 1988, pp. 1-22.
Katz et al., "REXTOR: A System for Generating Relations from Natural Language", Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Kitano, H., "PhiDM-Dialog, An Experimental Speech-to-Speech Dialog Translation System", Computer, vol. 24, No. 6, Jun. 1991, 13 pages.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Knownav, "Knowledge Navigator", YouTube Video available at <http://www.youtube.com/watch?v=QRH8eimU_20>, Apr. 29, 2008, 1 page.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Laird et al., "SOAR: An Architecture for General Intelligence", Artificial Intelligence, vol. 33, 1987, pp. 1-64.
Langley et al., "A Design for the ICARUS Architechture", SIGART Bulletin, vol. 2, No. 4, 1991, pp. 104-109.
Larks, "Intelligent Software Agents", available at <http://www.cs.cmu.edu/~softagents/larks.html> retrieved on Mar. 15, 2013, 2 pages.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "Casis: A Context-Aware Speech Interface System", Proceedings of the 10th International Conference on Intelligent User Interfaces, Jan. 2005, pp. 231-238.
Lewis, Cameron, "Task Ave for iPhone Review", Mac Life, Available at <http://www.maclife.com/article/reviews/task_ave_iphone_review>, Mar. 3, 2011, 5 pages.
Lieberman et al., "Out of Context: Computer Systems that Adapt to, and Learn from, Context", IBM Systems Journal, vol. 39, No. 3 & 4, 2000, pp. 617-632.
Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.

(56) References Cited

OTHER PUBLICATIONS

Logan et al., "Mel Frequency Cepstral Co-efficients for Music Modeling", International Symposium on Music Information Retrieval, 2000, 2 pages.

Lowerre, B. T., "The-Harpy Speech Recognition System", Doctoral Dissertation, Department of Computer Science, Carnegie Mellon University, Apr. 1976, 20 pages.

Mactech, "Keystrokes 3.5 for Mac Os X Boosts Word Prediction", available at <http://www.mactech.com/news/?p=1007129>, retrieved on Jan. 7, 2008, 3 pages.

Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.

Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.

Markel et al., "Linear Prediction of Speech", Springer-Verlag, Berlin, Heidelberg, New York, 1976, 12 pages.

Martin et al., "Building and Using Practical Agent Applications", SRI International, PAAM Tutorial, 1998, 78 pages.

Martin et al., "Building Distributed Software Systems with the Open Agent Architecture", Proceedings of the Third International Conference on the Practical Application of Intelligent Agents and Multi-Agent Technology, Mar. 1998, pp. 355-376.

Martin et al., "Development Tools for the Open Agent Architecture", Proceedings of the International Conference on the Practical Application of Intelligent Agents and Multi-Agent Technology, Apr. 1996, pp. 1-17.

Martin et al., "Information Brokering in an Agent Architecture", Proceedings of the Second International Conference on the Practical Application of Intelligent Agents and Multi-Agent Technology, Apr. 1997, pp. 1-20.

Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf> >, retrieved from internet on Jan.-Mar. 1999.

Martin et al., "Transportability and Generality in a Natural-Language Interface System", Proceedings of the Eighth International Joint Conference on Artificial Intelligence, Technical Note 293, Aug. 1983, 21 pages.

Martins et al., "Extracting and Exploring the Geo-Temporal Semantics of Textual Resources", Semantic Computing, IEEE International Conference, 2008, pp. 1-9.

Matiasek et al., "Tamic-P: A System for NL Access to Social Insurance Database", 4th International Conference on Applications of Natural Language to Information Systems, Jun. 1999, 7 pages.

McGuire et al., "SHADE: Technology for Knowledge-Based Collaborative Engineering", Journal of Concurrent Engineering Applications and Research (CERA), 1993, 18 pages.

Meet Ivee, Your Wi-Fi Voice Activated Assistant, available at <http://www.helloivee.com/>, retrieved on Feb. 10, 2014, 8 pages.

Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.

Meng et al., "Wheels: A Conversational System in the Automobile Classified Domain", Proceedings of Fourth International Conference on Spoken Language, ICSLP 96, vol. 1, Oct. 1996, 4 pages.

Mhatre et al., "Donna Interactive Chat-bot acting as a Personal Assistant", International Journal of Computer Applications (0975-8887), vol. 140, No. 10, Apr. 2016, 6 pages.

Michos et al., "Towards an Adaptive Natural Language Interface to Command Languages", Natural Language Engineering, vol. 2, No. 3, 1996, pp. 191-209.

Microsoft, "Turn On and Use Magnifier", available at <http://www.microsoft.com/windowsxp/using/accessibility/magnifierturnon.mspx>, retrieved on Jun. 6, 2009.

Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.

Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.

Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.

Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.

Minker et al., "Hidden Understanding Models for Machine Translation", Proceedings of ETRW on Interactive Dialogue in Multi-Modal Systems, Jun. 1999, pp. 1-4.

Mitra et al., "A Graph-Oriented Model for Articulation of Ontology Interdependencies", Advances in Database Technology, Lecture Notes in Computer Science, vol. 1777, 2000, pp. 1-15.

Mobile Speech Solutions, Mobile Accessibility, Svox Ag Product Information Sheet, available at <http://www.svox.com/site/bra840604/con782768/mob965831936.aSQ?osLang=1>, Sep. 27, 2012, 1 page.

Modi et al., "CMRadar: A Personal Assistant Agent for Calendar Management", AAAI, Intelligent Systems Demonstrations, 2004, pp. 1020-1021.

Moore et al., "Combining Linguistic and Statistical Knowledge Sources in Natural-Language Processing for ATIS", SRI International, Artificial Intelligence Center, 1995, 4 pages.

Moore et al., "SRI's Experience with the ATIS Evaluation", Proceedings of the Workshop on Speech and Natural Language, Jun. 1990, pp. 147-148.

Moore et al., "The Information Warfare Advisor: An Architecture for Interacting with Intelligent Agents Across the Web", Proceedings of Americas Conference on Information Systems (AMCIS), Dec. 31, 1998, pp. 186-188.

Moore, Robert C., "Handling Complex Queries in a Distributed Data Base", SRI International, Technical Note 170, Oct. 8, 1979, 38 pages.

Moore, Robert C., "Practical Natural-Language Processing by Computer", SRI International, Technical Note 251, Oct. 1981, 34 pages.

Moore, Robert C., "The Role of Logic in Knowledge Representation and Commonsense Reasoning", SRI International, Technical Note 264, Jun. 1982, 19 pages.

Moore, Robert C., "Using Natural-Language Knowledge Sources in Speech Recognition", SRI International, Artificial Intelligence Center, Jan. 1999, pp. 1-24.

Moran et al., "Intelligent Agent-Based User Interfaces", Proceedings of International Workshop on Human Interface Technology, Oct. 1995, pp. 1-4.

Moran et al., "Multimodal User Interfaces in the Open Agent Architecture", International Conference on Intelligent User Interfaces (IUI97), 1997, 8 pages.

Moran, Douglas B., "Quantifier Scoping in the SRI Core Language Engine", Proceedings of the 26th Annual Meeting on Association for Computational Linguistics, 1988, pp. 33-40.

Morgan, B., "Business Objects (Business Objects for Windows) Business Objects Inc.", DBMS, vol. 5, No. 10, Sep. 1992, 3 pages.

Morrison, Jonathan, "iPhone 5 Siri Demo", Online Available at <https://www.youtube.com/watch?v=_wHWwG5IhWc>, Sep. 21, 2012, 3 pages.

Morton, Philip, "Checking If An Element Is Hidden", StackOverflow, Available at <http://stackoverflow.com/questions/178325/checking-if-an-element-is-hidden>, Oct. 7, 2008, 12 pages.

Motro, Amihai, "Flex: A Tolerant and Cooperative User Interface to Databases", IEEE Transactions on Knowledge and Data Engineering, vol. 2, No. 2, Jun. 1990, pp. 231-246.

(56) References Cited

OTHER PUBLICATIONS

Mountford et al., "Talking and Listening to Computers", The Art of Human-Computer Interface Design, Apple Computer, Inc., Addison-Wesley Publishing Company, Inc., 1990, 17 pages.

Mozer, Michael C., "An Intelligent Environment must be Adaptive", IEEE Intelligent Systems, 1999, pp. 11-13.

Murty et al., "Combining Evidence from Residual Phase and MFCC Features for Speaker Recognition", IEEE Signal Processing Letters, vol. 13, No. 1, Jan. 2006, 4 pages.

Murveit et al., "Integrating Natural Language Constraints into HMM-Based Speech Recognition", International Conference on Acoustics, Speech and Signal Processing, Apr. 1990, 5 pages.

Murveit et al., "Speech Recognition in SRI's Resource Management and ATIS Systems", Proceedings of the Workshop on Speech and Natural Language, 1991, pp. 94-100.

My Cool Aids, "What's New", available at <http://www.mycoolaids.com/>, 2012, 1 page.

Myers, Brad A., "Shortcutter for Palm", available at <http://www.cs.cmu.edu/~pebbles/v5/shortcutter/palm/index.html>, retrieved on Jun. 18, 2014, 10 pages.

Nakagawa et al., "Speaker Recognition by Combining MFCC and Phase Information", IEEE International Conference on Acoustics, Speech and Signal Processing (ICASSP), Mar. 2010, 4 pages.

Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).

Naone, Erica, "TR10: Intelligent Software Assistant", Technology Review, Mar.-Apr. 2009, 2 pages.

Navigli, Roberto, "Word Sense Disambiguation: A Survey", ACM Computing Surveys, vol. 41, No. 2, Feb. 2009, 69 pages.

NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.

Neches et al., "Enabling Technology for Knowledge Sharing", Fall, 1991, pp. 37-56.

Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.

Niesler et al., "A Variable-Length Category-Based N-Gram Language Model", IEEE International Conference on Acoustics, Speech and Signal Processing (ICASSP'96), vol. 1, May 1996, 6 pages.

Non-Final Office Action received for U.S. Appl. No. 12/244,713, dated Dec. 23, 2011, 11 pages.

Non-Final Office Action received for U.S. Appl. No. 13/615,427, dated Feb. 28, 2013, 6 pages.

Non-Final Office Action received for U.S. Appl. No. 14/165,520, dated Nov. 5, 2015, 7 pages.

Non-Final Office Action received for U.S. Appl. No. 14/165,520, dated Oct. 10, 2014, 6 pages.

Non-Final Office Action received for U.S. Appl. No. 15/207,248, dated Jun. 23, 2017, 32 pages.

Non-Final Office Action received for U.S. Appl. No. 15/938,603, dated Aug. 5, 2019, 8 pages.

Noth et al., "Verbmobil: The Use of Prosody in the Linguistic Components of a Speech Understanding System", IEEE Transactions On Speech and Audio Processing, vol. 8, No. 5, Sep. 2000, pp. 519-532.

Notice of Allowance received for U.S. Appl. No. 12/244,713, dated Apr. 2, 2013, 8 pages.

Notice of Allowance received for U.S. Appl. No. 12/244,713, dated Aug. 7, 2012, 7 pages.

Notice of Allowance received for U.S. Appl. No. 12/244,713, dated Dec. 5, 2012, 5 pages.

Notice of Allowance received for U.S. Appl. No. 12/244,713, dated Jul. 8, 2013, 9 pages.

Notice of Allowance received for U.S. Appl. No. 12/244,713, dated May 10, 2012, 5 pages.

Notice of Allowance received for U.S. Appl. No. 12/244,713, dated Nov. 8, 2013, 9 pages.

Notice of Allowance received for U.S. Appl. No. 13/480,422, dated Jul. 19, 2012, 9 pages.

Notice of Allowance received for U.S. Appl. No. 13/480,422, dated Sep. 27, 2012, 2 pages.

Notice of Allowance received for U.S. Appl. No. 13/604,556, dated Apr. 1, 2013, 9 pages.

Notice of Allowance received for U.S. Appl. No. 13/604,556, dated Feb. 24, 2014, 5 pages.

Notice of Allowance received for U.S. Appl. No. 13/604,556, dated Jul. 31, 2013, 9 pages.

Notice of Allowance received for U.S. Appl. No. 13/615,427, dated Jan. 2, 2014, 2 pages.

Notice of Allowance received for U.S. Appl. No. 13/615,427, dated Jun. 12, 2013, 6 pages.

Notice of Allowance received for U.S. Appl. No. 13/615,427, dated Sep. 27, 2013, 6 pages.

Notice of Allowance received for U.S. Appl. No. 14/165,520, dated Apr. 8, 2016, 5 pages.

Notice of Allowance received for U.S. Appl. No. 14/165,520, dated Jun. 26, 2015, 8 pages.

Notice of Allowance received for U.S. Appl. No. 15/207,248, dated Dec. 28, 2017, 8 pages.

Notice of Allowance received for U.S. Appl. No. 15/938,603, dated Jan. 2, 2020, 5 pages.

Nozawa, Naoki et al., "iPhone 4S Perfect Manual", vol. 1, First Edition, Nov. 11, 2011, 5 pages,.

Odubiyi et al., "SAIRE—A Scalable Agent-Based Information Retrieval Engine", Proceedings of the First International Conference on Autonomous Agents, 1997, 12 pages.

Osxdaily, "Get a List of Siri Commands Directly from Siri", Available at <http://osxdaily.com/2013/02/05/list-siri-commands/>, Feb. 5, 2013, 15 pages.

Owei et al., "Natural Language Query Filtration in the Conceptual Query Language", IEEE, 1997, pp. 539-549.

Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.

Pannu et al., "A Learning Personal Agent for Text Filtering and Notification", Proceedings of the International Conference of Knowledge Based Systems, 1996, pp. 1-11.

Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.

Parson, T. W., "Voice and Speech Processing", Pitch and Formant Estimation, McGraw-Hill, Inc., ISBN: 0-07-0485541-0, 1987, 15 pages.

Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.

Patent Abstracts of Japan, vol. 014, No. 273 (E-0940)Jun. 13, 1990 (Jun. 13, 1990)—& JP 02 086057 A (Japan Storage Battery Co Ltd), Mar. 27, 1990 (Mar. 27, 1990), 3 pages.

Pathak et al., "Privacy-preserving Speech Processing: Cryptographic and String-matching Frameworks Show Promise", In: IEEE signal processing magazine, Yetrieved from <http://www.merl.com/publications/docs/TR2013-063.pdf>, Feb. 13, 2013, 16 pages.

Patra et al., "A Kernel-Based Approach for Biomedical Named Entity Recognition", Scientific World Journal, vol. 2013, 2013, pp. 1-7.

Pereira, Fernando, "Logic for Natural Language Analysis", SRI International, Technical Note 275, Jan. 1983, 194 pages.

Perrault et al., "Natural-Language Interfaces", SRI International, Technical Note 393, Aug. 22, 1986, 48 pages.

Phoenix Solutions, Inc., "Declaration of Christopher Schmandt Regarding the MIT Galaxy System", West Interactive Corp., A Delaware Corporation, Document 40, Jul. 2, 2010, 162 pages.

Picone, J., "Continuous Speech Recognition using Hidden Markov Models", IEEE ASSP Magazine, vol. 7, No. 3, Jul. 1990, 16 pages.

(56) References Cited

OTHER PUBLICATIONS

Powell, Josh, "Now You See Me . . . Show/Hide Performance", available at http://www.learningjquery.com/2010/05/now-you-see-me-showhide-performance, May 4, 2010, 3 pages.

Pulman et al., "Clare: A Combined Language and Reasoning Engine", Proceedings of JFIT Conference, available at <http://www.cam.sri.eom/tr/crc042/paper.ps.Z>, 1993, 8 pages.

Rabiner et al., "Fundamental of Speech Recognition", AT&T, Published by Prentice-Hall, Inc., ISBN: 0-13-285826-6, 1993, 17 pages.

Rabiner et al., "Note on the Properties of a Vector Quantizer for LPC Coefficients", Bell System Technical Journal, vol. 62, No. 8, Oct. 1983, 9 pages.

Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.

Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.

Rayner et al., "Adapting the Core Language Engine to French and Spanish", Cornell University Library, available at <http:l/arxiv.org/abs/cmp-Ig/9605015>, May 10, 1996, 9 pages.

Rayner et al., "Deriving Database Queries from Logical Forms by Abductive Definition Expansion", Proceedings of the Third Conference on Applied Natural Language Processing, ANLC, 1992, 8 pages.

Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.

Rayner, M., "Abductive Equivalential Translation and its Application to Natural Language Database Interfacing", Dissertation Paper, SRI International, Sep. 1993, 162 pages.

Rayner, Manny, "Linguistic Domain Theories: Natural-Language Database Interfacing from First Principles", SRI International, Cambridge, 1993, 11 pages.

Remde et al., "SuperBook: An Automatic Tool for Information Exploration-Hypertext?", In Proceedings of Hypertext, 87 Papers, Nov. 1987, 14 pages.

Reynolds, C. F., "On-Line Reviews: A New Application of the HICOM Conferencing System", IEEE Colloquium on Human Factors in Electronic Mail and Conferencing Systems, Feb. 3, 1989, 4 pages.

Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.

Rice et al., "Using the Web Instead of a Window System", Proceedings of the SIGCHI Conference on Human Factors in Computing Systems, CHI'96, 1996, pp. 1-14.

Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.

Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.

Rivlin et al., "Maestro: Conductor of Multimedia Analysis Technologies", SRI International, 1999, 7 pages.

Rivoira et al., "Syntax and Semantics in a Word-Sequence Recognition System", IEEE International Conference on Acoustics, Speech and Signal Processing (ICASSP'79), Apr. 1979, 5 pages.

Roddy et al., "Communication and Collaboration in a Landscape of B2B eMarketplaces", VerticalNet Solutions, White Paper, Jun. 15, 2000, 23 pages.

Rosenfeld, R., "A Maximum Entropy Approach to Adaptive Statistical Language Modelling", Computer Speech and Language, vol. 10, No. 3, Jul. 1996, 25 pages.

Roszkiewicz, A., "Extending your Apple", Back Talk-Lip Service, A+ Magazine, The Independent Guide for Apple Computing, vol. 2, No. 2, Feb. 1984, 5 pages.

Routines, "SmartThings Support", Available online at <https://web.archive.org/web/20151207165701 /https://support.smartthings.com/hc/en-us/articles/205380034-Routines>, 2015, 2 pages.

Rudnicky et al., "Creating Natural Dialogs in the Carnegie Mellon Communicator System", Proceedings of Eurospeech, vol. 4, 1999, pp. 1531-1534.

Russell et al., "Artificial Intelligence, A Modern Approach", Prentice Hall, Inc., 1995, 121 pages.

Sacerdoti et al., "A Ladder User's Guide (Revised)", SRI International Artificial Intelligence Center, Mar. 1980, 39 pages.

Sagalowicz, D., "AD-Ladder User's Guide", SRI International, Sep. 1980, 42 pages.

Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.

Salton et al., "On the Application of Syntactic Methodologies in Automatic Text Analysis", Information Processing and Management, vol. 26, No. 1, Great Britain, 1990, 22 pages.

Sameshima et al., "Authorization with Security Attributes and Privilege Delegation Access control beyond the ACL", Computer Communications, vol. 20, 1997, 9 pages.

San-Segundo et al., "Confidence Measures for Dialogue Management in the CU Communicator System", Proceedings of Acoustics, Speech and Signal Processing (ICASSP'00), Jun. 2000, 4 pages.

Sarawagi, Sunita, "CRF Package Page", available at <http://crf.sourceforge.net/>, retrieved on Apr. 6, 2011, 2 pages.

Sarvas et al., "Metadata Creation System for Mobile Images", Conference Proceedings, The Second International Conference On Mobile Systems, Applications And Services, Jun. 6, 2004, pp. 36-48.

Sato, H., "A Data Model, Knowledge Base and Natural Language Processing for Sharing a Large Statistical Database", Statistical and Scientific Database Management, Lecture Notes in Computer Science, vol. 339, 1989, 20 pages.

Savoy, J., "Searching Information in Hypertext Systems Using Multiple Sources of Evidence", International Journal of Man-Machine Studies, vol. 38, No. 6, Jun. 1996, 15 pages.

Scagliola, C., "Language Models and Search Algorithms for Real-Time Speech Recognition", International Journal of Man-Machine Studies, vol. 22, No. 5, 1985, 25 pages.

Schmandt et al., "Augmenting a Window System with Speech Input", IEEE Computer Society, Computer, vol. 23, No. 8, Aug. 1990, 8 pages.

Schnelle, Dirk, "Context Aware Voice User Interfaces for Workflow Support", Dissertation paper, Aug. 27, 2007, 254 pages.

Schütze, H., "Dimensions of Meaning", Proceedings of Supercomputing'92 Conference, Nov. 1992, 10 pages.

Selfrifge et al., "Interact: Tightly-coupling Multimodal Dialog with an Interactive Virtual Assistant", International Conference On Multimodal Interaction, ACM, Nov. 9, 2015, pp. 381-382.

Seneff et al., "A New Restaurant Guide Conversational System: Issues in Rapid Prototyping for Specialized Domains", Proceedings of Fourth International Conference on Spoken Language, vol. 2, 1996, 4 pages.

Sharoff et al., "Register-Domain Separation as a Methodology for Development of Natural Language Interfaces to Databases", Proceedings of Human-Computer Interaction (INTERACT'99), 1999, 7 pages.

Sheth et al., "Evolving Agents for Personalized Information Filtering", Proceedings of the Ninth Conference on Artificial Intelligence for Applications, Mar. 1993, 9 pages.

Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.

(56) References Cited

OTHER PUBLICATIONS

Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "InfoHarness: Use of Automatically Generated Metadata for Search and Retrieval of Heterogeneous Information", Proceedings of CAiSE'95, Finland, 1995, 14 pages.
Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
"SmartThings +Amazon Echo", Smartthings Samsung [online], Available online at <https://web.archive.org/web/20160509231428/https://blog.smartthings.com/featured/alexa-turn-on-my-smart-things/>, Aug. 21, 2015, 3 pages.
Speaker Recognition, Wikipedia, The Free Enclyclopedia, Nov. 2, 2010, 4 pages.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
SRI International, "The Open Agent Architecture TM 1.0 Distribution", Open Agent Architecture (OAA), 1999, 2 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Srihari, R. K.., "Use of Multimedia Input In Automated Image Annotation And Content-based Retrieval", Proceedings Of Spie, International Society For Optical Engineering, vol. 2420, Feb. 9, 1995., pp. 249-260.
Starr et al., "Knowledge-Intensive Query Processing", Proceedings of the 5th KRDB Workshop, Seattle, May 31, 1998, 6 pages.
Stent et al., "Geo-Centric Language Models for Local Business Voice Search", AT&T Labs—Research, 2009, pp. 389-396.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Sugumaran, V., "A Distributed Intelligent Agent-Based Spatial Decision Support System", Proceedings of the Americas Conference on Information systems (AMCIS), Dec. 31, 1998, 4 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", Prentice-Hall, Inc., 1981, 34 pages.
Textndrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Timothy et al., "Speech-Based Annotation and Retrieval of Digital Photographs", Interspeech. 8th Annual Conference Of The International Speech Communication Association, Aug. 27, 2007, pp. 2165-2168.
Tofel, Kevin C., "SpeakTolt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1994, 9 pages.
Van Santen, J. P.H., "Contextual Effects on Vowel Duration", Journal Speech Communication, vol. 11, No. 6, Dec. 1992, pp. 513-546.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.
Miki et al., "Speaker- and Language-Independent Speech Recognition in Mobile Communication Systems", IEEE, vol. 1,2001, pp. 5-8.
Vingron, Martin, "Near-Optimal Sequence Alignment", Current Opinion in Structural Biology, vol. 6, No. 3, 1996, pp. 346-352.
Vlingo Incar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Vodafone Deutschland, "Samsung Galaxy S3 TastaturSpracheingabe", Available online at—"https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=OtEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wahlster et al., "Smartkom: Multimodal Communication with a Life-Like Character", Eurospeech-Scandinavia, 7th European Conference on Speech Communication and Technology, 2001, 5 pages.

(56) References Cited

OTHER PUBLICATIONS

Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", ACM, vol. 21, No. 7, 1978, 14 pages.
Ward et al., "A Class Based Language Model for Speech Recognition", IEEE, 1996, 3 pages.
Ward et al., "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Warren et al., "An Efficient Easily Adaptable System for Interpreting Natural Language Queries", American Journal of Computational Linguistics, vol. 8, No. 3-4, 1982, 11 pages.
Weizenbaum, J., "Eliza—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wolff, M., "Post Structuralism and the ARTFUL Database: Some Theoretical Considerations", Information Technology and Libraries, vol. 13, No. 1, Mar. 1994, 10 pages.
Wu et al., "KDA: A Knowledge-Based Database Assistant", Proceeding of the Fifth International Conference on Engineering (IEEE Cat.No.89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
X.Ai, "How it Works", May 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yan et al., "A Scalable Approach to Using DNN-Derived Features in GMM-HMM Based Acoustic Modeling for LVCSR", InInterspeech, 2013, pp. 104-108.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yoon et al., "Letter-to-Sound Rules for Korean", Department of Linguistics, The Ohio State University, 2002, 4 pages.
Young et al., "The Hidden Information State model: A practical framework for POMDP-based spoken dialogue management", Computer Speech & Language, vol. 24, Issue 2, 2010, pp. 150-174.
Youtube, "New bar search for Facebook", Available at "https://www.youtube.com/watch?v=vwgN1WbvCas", 1 page.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Zovato et al., "Towards Emotional Speech Synthesis: A Rule based Approach", Proceedings of 5th ISCA Speech Synthesis Workshop-Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.

\* cited by examiner

ELECTRONIC DEVICES WITH VOICE COMMAND AND CONTEXTUAL DATA PROCESSING CAPABILITIES

CROSS-REFERENCE TO RELATED APPLICATIONS

This application is a continuation of U.S. patent application Ser. No. 15/938,603, filed Mar. 28, 2018, which is a continuation of U.S. patent application Ser. No. 15/207,248, filed Jul. 11, 2016 (now U.S. Pat. No. 9,959,867, issued May 1, 2018), which is a continuation of U.S. patent application Ser. No. 14/165,520, filed Jan. 27, 2014 (now U.S. Pat. No. 9,412,392, issued Aug. 9, 2016), which is a continuation of U.S. patent application Ser. No. 12/244,713, filed on Oct. 2, 2008 (now U.S. Pat. No. 8,676,904, issued Mar. 18, 2014). The above referenced applications are incorporated by reference for all purposes as if fully set forth herein.

BACKGROUND

This invention relates generally to electronic devices, and more particularly, to electronic devices such as portable electronic devices that can capture voice commands and contextual information.

Electronic devices such as portable electronic devices are becoming increasingly popular. Examples of portable devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may have limited speech recognition capabilities. For example, a cellular telephone may have a microphone that can be used to receive and process cellular telephone voice commands that control the operation of the cellular telephone.

Portable electronic devices generally have limited processing power and are not always actively connected to remote databases and services of interest. Conventional devices are often not contextually aware. These shortcomings can make it difficult to use conventional portable electronic devices for sophisticated voice-based control functions.

It would therefore be desirable to be able to provide improved systems for electronic devices such as portable electronic devices that handle voice-based commands.

SUMMARY

A portable electronic device such as a handheld electronic device is provided. The electronic device may have a microphone that is used to receive voice commands. The electronic device may use the microphone to record a user's voice. The recording of the user's voice may be stored as a digital audio file in storage associated with the electronic device.

When the electronic device receives a voice command, the electronic device may store information about the current state of the electronic device and its operating environment as contextual information (metadata). With one suitable arrangement, stored contextual information may include information about the operational state of the electronic device such as which applications are running on the device and their status. The electronic device may determine which portions of the information on the state of the device are relevant to the voice command and may store only the relevant portions. If desired, the electronic device may determine which contextual information is most relevant by performing a speech recognition operation on the recorded voice command to look for specific keywords.

The electronic device may process voice commands locally or voice commands processing may be performed remotely. For example, the electronic device may transmit one or more recorded voice commands and associated contextual information to computing equipment such as a desktop computer. Captured voice commands and contextual information may also be uploaded to server computing equipment over a network. The electronic device may transmit recorded voice commands and the associated contextual information at any suitable time such as when instructed by a user, as each voice command is received, immediately after each voice command is received, whenever the electronic device is synched with appropriate computing equipment, or other suitable times.

After a recorded voice command and associated contextual information have been transferred to a desktop computer, remote server, or other computing equipment, the computing equipment may process the voice command using a speech recognition operation. The computing equipment may use the results of the speech recognition operation and any relevant contextual information together to respond to the voice command properly. For example, the computing equipment may respond to the voice command by displaying search results or performing other suitable actions). If desired, the computing equipment may convey information back to the electronic device in response to the voice command.

In a typical scenario, a user may make a voice command while directing the electronic device to record the voice command. The user may make the voice command while the electronic device is performing a particular operation with an application. For example, the user may be using the electronic device to play songs with a media application. While listening to a song, the user may press a record button on the electronic device to record the voice command "find more like this." The voice command may be processed by the electronic device (e.g., to create a code representative of the spoken command) or may be stored in the form of an audio clip by the electronic device. At an appropriate time, such as when the electronic device is connected to a host computer or a remote server through a communications path, the code or the audio clip corresponding to the spoken command may be uploaded for further processing. Contextual information such as information on the song that was playing in the media application when the voice command was made may be uploaded with the voice command.

A media playback application on a computer such as the iTunes program of Apple Inc. may take an appropriate action in response to an uploaded voice command and associated contextual data. As an example, the media playback application may present a user with recommended songs for purchase. The songs that are recommended may be songs that are similar to the song that was playing on the electronic device when the user captured the audio clip voice command "find more like this."

The computer to which the voice command audio clip is uploaded may have greater processing power available than that available on a handheld electronic device, so voice processing accuracy may be improved by offloading voice recognition operations to the computer from the handheld electronic device in this way. The computer to which the audio clip is uploaded may also have access to more extensive data that would be available on a handheld electronic device such as the contents of a user's full home media library. The computer that receives the uploaded command may also have access to online resources such as an online server database. This database may have been difficult or impossible for the user to access from the handheld device when the voice command was captured.

If desired, the contextual information that is captured by the electronic device in association with a captured voice command may include audio information. For example, a user may record a spoken phrase. Part of the spoken phrase may represent a voice command and part of the spoken phrase may include associated contextual information. As an example, a user may be using a mapping application on a handheld electronic device. The device may be presenting the user with a map that indicates the user's current position. The user may press a button or may otherwise instruct the handheld electronic device to record the phrase "I like American restaurants in this neighborhood." In response, the electronic device may record the spoken phrase. The recorded phrase (in this example), includes a command portion ("I like") that instructs the mapping application to create a bookmark or other indicator of the user's preference. The recorded phrase also includes the modifier "American restaurants" to provide partial context for the voice command. Additional contextual information (i.e., the phrase "in this neighborhood) and accompanying position data (e.g., geographic coordinates from global positioning system circuitry in the device) may also be supplied in conjunction with the recorded voice command. When uploaded, the audio clip voice command and the associated audio clip contextual information can be processed by speech recognition software and appropriate actions taken.

Further features of the invention, its nature and various advantages will be more apparent from the accompanying drawings and the following detailed description of the preferred embodiments.

DETAILED DESCRIPTION

The present invention relates to using voice commands to control electronic systems.

Voice commands may be captured with an electronic device and uploaded to computing equipment for further processing. Electronic devices that may be used in this type of environment may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
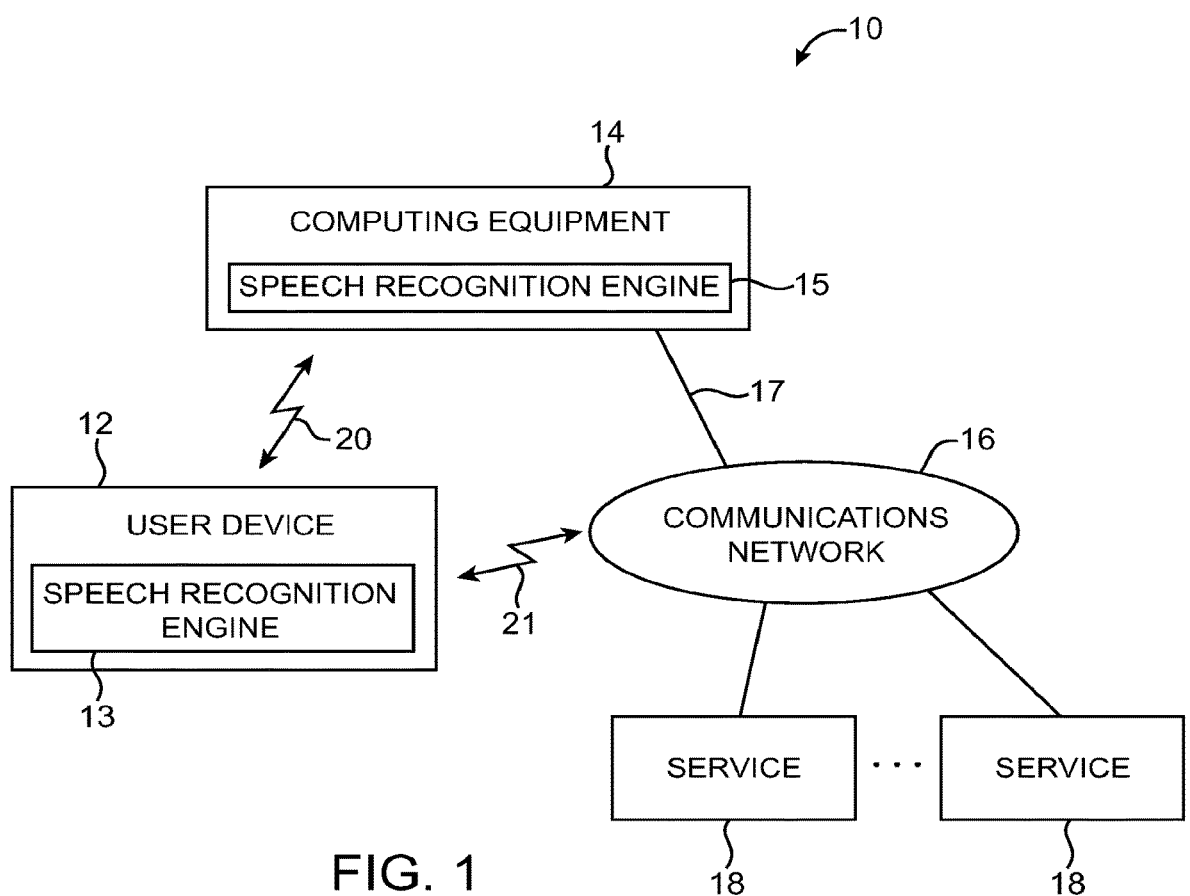
FIG. 1 is a diagram of an illustrative system environment in which a portable electronic device and computing equipment with speech recognition functionality may be used in accordance with an embodiment of the present invention.

An illustrative environment in which a user may interact with system components using voice commands is shown in FIG. 1. A user in system 10 may have an electronic device such as user device 12. User device 12 may be used to receive voice commands (e.g., to record a user's voice). If device 12 has sufficient processing power, the voice commands may be partly or fully processed by user device 12 (e.g., using a speech recognition engine such as speech recognition engine 13). If desired, the voice commands may be transmitted by user device 12 to computing equipment 14 over communications path 20. Voice commands may also be conveyed to remote services 18 over network 16 (e.g., via path 21 or via path 20, equipment 14, and path 17).

When user device 12 transmits voice commands to computing equipment 14, the user device may include contextual information along with the voice commands. User device 12, computing equipment 14, and services 18 may be connected through a network such as communications network 16. Network 16 may be, for example, a local area network, a wide area network such as the Internet, a wired network, a wireless network, or a network formed from multiple networks of these types. User device 12 may connect to communications network 16 through a wired or wireless communications path such as path 21 or may connect to network 16 via equipment 14. In one embodiment of the invention, user device 12 may transmit voice commands and contextual information to computing equipment 14 through communications network 16. User device 12 may also transmit voice commands and contextual information to computing equipment 14 directly via communications path 20. Path 20 may be, for example, a universal serial bus (USB®) path or any other suitable wired or wireless path.

User device 12 may have any suitable form factor. For example, user device 12 may be provided in the form of a handheld device, desktop device, or even integrated as part of a larger structure such as a table or wall. With one particularly suitable arrangement, which is sometimes described herein as an example, user device 12 may be provided with a handheld form factor. For example, device 12 may be a handheld electronic device. Illustrative handheld electronic devices that may be provided with voice command recording capabilities include cellular telephones, media players, media players with wireless communications capabilities, handheld computers (also sometimes called personal digital assistants), global positioning system (GPS) devices, handheld gaming devices, and other handheld devices. If desired, user device 12 may be a hybrid device that combines the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, supports web browsing, and includes media player functionality. These are merely illustrative examples.

Computing equipment 14 may include any suitable computing equipment such as a personal desktop computer, a laptop computer, a server, etc. With one suitable arrangement, computing equipment 14 is a computer that establishes a wired or wireless connection with user device 12. The computing equipment may be a server (e.g., an internet server), a local area network computer with or without internet access, a user's own personal computer, a peer device (e.g., another user device 12), any other suitable computing equipment, and combinations of multiple pieces of computing equipment. Computing equipment 14 may be used to implement applications such as media playback applications (e.g., iTunes® from Apple Inc.), a web browser, a mapping application, an email application, a calendar application, etc.

Computing equipment 18 (e.g., one or more servers) may be associated with one or more online services.

Communications path 17 and the other paths in system 10 such as path 20 between device 12 and equipment 14, path 21 between device 12 and network 16, and the paths between network 16 and services 18 may be based on any suitable wired or wireless communications technology. For example, the communications paths in system 10 may be based on wired communications technology such as coaxial cable, copper wiring, fiber optic cable, universal serial bus (USB®), IEEE 1394 (FireWire®), paths using serial protocols, paths using parallel protocols, and Ethernet paths. Communications paths in system 10 may, if desired, be based on wireless communications technology such as satellite technology, radio-frequency (RF) technology, wireless universal serial bus technology, and Wi-Fi® or Bluetooth® 802.11 wireless link technologies. Wireless communications paths in system 10 may also include cellular telephone bands such as those at 850 MHz, 900 MHz, 1800 MHz, and 1900 MHz (e.g., the main Global System for Mobile Communications or GSM cellular telephone bands), one or more proprietary radio-frequency links, and other local and remote wireless links. Communications paths in system 10 may also be based on wireless signals sent using light (e.g., using infrared communications) or sound (e.g., using acoustic communications).

Communications path 20 may be used for one-way or two-way transmissions between user device 12 and computing equipment 14. For example, user device 12 may transmit voice commands and contextual information to computing equipment 14. After receiving voice commands and contextual information from user device 12, computing equipment 14 may process the voice commands and contextual information using a speech recognition engine such as speech recognition engine 15. Engine 15 may be provided as a standalone software component or may be integrated into a media playback application or other application. If desired, computing equipment 14 may transmit data signals to user device 12. Equipment 14 may, for example, transmit information to device 12 in response to voice commands transmitted by device 12 to system 14. For example, when a voice command transmitted by device 12 includes a request to search for information, system 14 may transmit search results back to device 12.

Communications network 16 may be based on any suitable communications network or networks such as a radio-frequency network, the Internet, an Ethernet network, a wireless network, a Wi-Fi® network, a Bluetooth® network, a cellular telephone network, or a combination of such networks.

Services 18 may include any suitable online services. Services 18 may include a speech recognition service (e.g., a speech recognition dictionary), a search service (e.g., a service that searches a particular database or that performs Internet searches), an email service, a media service, a software update service, an online business service, etc. Services 18 may communicate with computing equipment 14 and user device 12 through communications network 16.

In typical user, user device 12 may be used to capture voice commands from a user during the operation of user device 12. For example, user device 12 may receive one or more voice commands during a media playback operation (e.g., during playback of a music file or a video file). User device 12 may then store information about its current operational state as contextual information. User device 12 may record information related to the current media playback operation. Other contextual information may be stored when other applications are running on device 12. For example, user device 12 may store information related to a web-browsing application, the location of user device 12, or other appropriate information on the operating environment for device 12. Following the reception of a voice command, user device 12 may, if desired, perform a speech recognition operation on the voice command. User device 12 may utilize contextual information about the state of the user device at the time the voice command was received during the associated speech recognition operation.

In addition to or in lieu of performing a local speech recognition operation on the voice command using engine 13, user device 12 may forward the captured voice command audio clip and, if desired, contextual information to computing equipment 14 for processing. Computing equipment 14 may use engine 15 to implement speech recognition capabilities that allow computing equipment 14 to respond to voice commands that user device 12 might otherwise have difficulties in processing. For example, if user device 12 were to receive a voice command to "find Italian restaurants near me," user device 12 might not be able to execute the voice command immediately for reasons such as an inability to perform adequate speech processing due to a lack of available processing power, an inability to perform a search requested by a voice command due to a lack of network connectivity, etc. In this type of situation, device 12 may save the voice command (e.g., as a recorded audio file of a user's voice) and relevant contextual information (e.g., the current location of user device 12) for transmission to computing equipment 14 for further processing of the voice command. Device 12 may transmit voice commands and contextual information to computing equipment 14 at any suitable time (e.g., when device 12 is synched with computing equipment 14, as the voice commands are received by device 12, whenever device 12 is connected to a communications network, etc.). These transmissions may take place simultaneously or as two separate but related transmissions.

With one suitable arrangement, device 12 may save all available contextual information. With another arrangement, device 12 may perform a either a cursory or a full speech recognition operation on voice commands to determine what contextual information is relevant and then store only the relevant contextual information. As an example, user device 12 may search for the words "music" and "location" in a voice command to determine whether the contextual information stored in association with the voice command should include information related to a current media playback operation or should include the current location of user device 12 (e.g., which may be manually entered by a user or may be determined using a location sensor).

Figure 2:
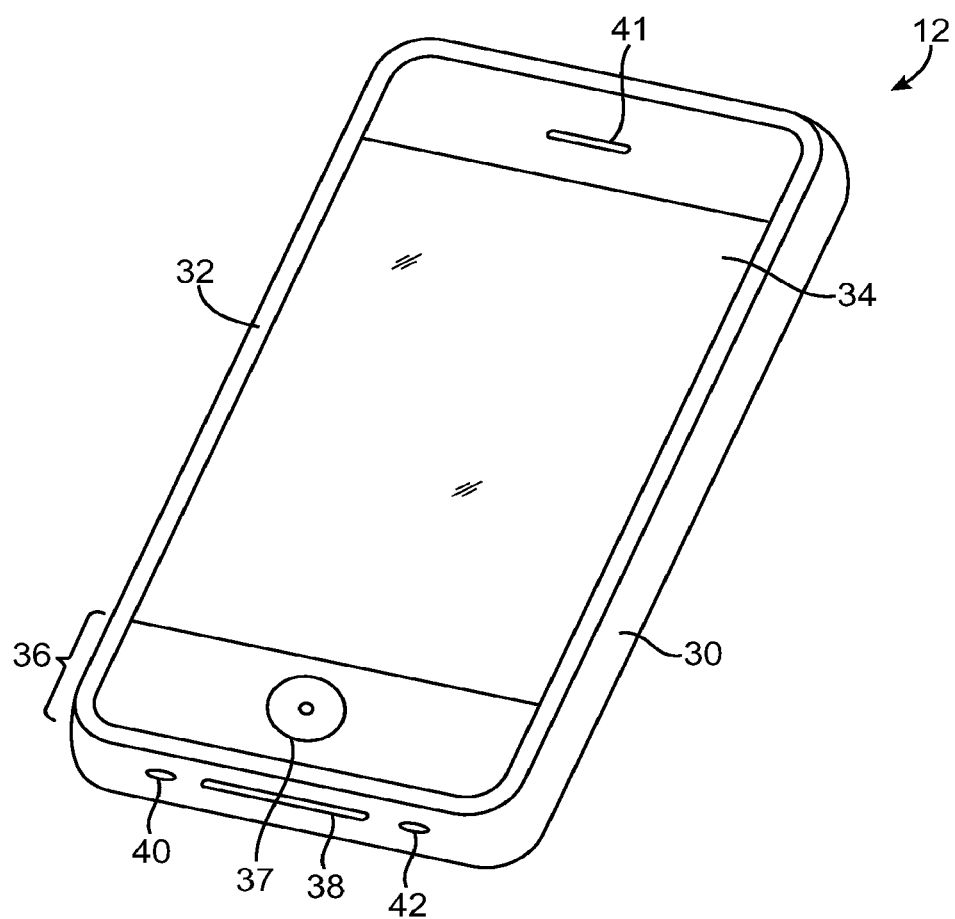
FIG. 2 is a perspective view of an illustrative portable electronic device in accordance with an embodiment of the present invention.

An illustrative user device 12 in accordance with an embodiment of the present invention is shown in FIG. 2. User device 12 may be any suitable electronic device such as a portable or handheld electronic device.

User device 12 may handle communications over one or more wireless communications bands such as local area network bands and cellular telephone network bands.

Device 12 may have a housing 30. Display 34 may be attached to housing 30 using bezel 32. Display 34 may be a touch screen liquid crystal display (as an example).

Device 12 may have a microphone for receiving voice commands. Openings 42 and 40 may, if desired, form microphone and speaker ports. With one suitable arrangement, device 12 may have speech recognition capabilities (e.g., a speech recognition engine that can be used to receive and process voice commands from a user). Device 12 may also have audio capture and playback capabilities. Device 12 may be able to receive voice commands from a user and other audio though a microphone (e.g., formed as part of one or more ports such as openings 40 and 42). Port 41 may be, for example, a speaker sport. If desired, device 12 may activate its audio recording and/or speech recognition capabilities (e.g., device 12 may begin recording audio signals associated with a user's voice with a microphone) in response to user input. For example, device 12 may present an on-screen selectable option to the user to activate speech recognition functionality. Device 12 may also have a user input device such as button 37 that is used to receive user input to activate speech recognition functionality.

User device 12 may have other input-output devices. For example, user device 12 may have other buttons. Input-output components such as port 38 and one or more input-output jacks (e.g., for audio and/or video) may be used to connect device 12 to computing equipment 14 and external accessories. Button 37 may be, for example, a menu button. Port 38 may contain a 30-pin data connector (as an example). Suitable user input interface devices for user device 12 may also include buttons such as alphanumeric keys, power on-off, power-on, power-off, voice memo, and other specialized buttons, a touch pad, pointing stick, or other cursor control device, or any other suitable interface for controlling user device 12. In the example of FIG. 2, display screen 34 is shown as being mounted on the front face of user device 12, but display screen 34 may, if desired, be mounted on the rear face of user device 12, on a side of user device 12, on a flip-up portion of user device 12 that is attached to a main body portion of user device 12 by a hinge (for example), or using any other suitable mounting arrangement. Display 34 may also be omitted Although shown schematically as being formed on the top face of user device 12 in the example of FIG. 2, buttons such as button 37 and other user input interface devices may generally be formed on any suitable portion of user device 12. For example, a button such as button 37 or other user interface control may be formed on the side of user device 12. Buttons and other user interface controls can also be located on the top face, rear face, or other portion of user device 12. If desired, user device 12 can be controlled remotely (e.g., using an infrared remote control, a radio-frequency remote control such as a Bluetooth® remote control, etc.). With one suitable arrangement, device 12 may receive voice commands and other audio through a wired or wireless headset or other accessory. Device 12 may also activate its speech recognition functionality in response to user input received through a wired or wireless headset (e.g., in response to a button press received on the headset).

Device 12 may use port 38 to perform a synchronization operation with computing equipment 14. With one suitable arrangement, device 12 may transmit voice commands and contextual information to computing equipment 14. For example, during a media playback operation, device 12 may receive a voice command to "find more music like this." If desired, device 12 may upload the voice command and relevant contextual information (e.g., the title and artist of the media file that was playing when the voice command was received) to computing equipment 14. Computing equipment 14 may receive and process the voice command and relevant contextual information and may perform a search for music that is similar to the media file that was playing when the voice command was received. Computing equipment 14 may then respond by displaying search results, purchase recommendations, etc.

Device 12 may receive data signals from computing equipment 14 in response to uploading voice commands and contextual information. The data received by device 12 from equipment 14 in response to voice commands and contextual information may be used by device 12 to carry out requests associated with the voice commands. For example, after processing the voice command and contextual information, computing equipment 14 may transmit results associated with the voice command to user device 12 which may then display the results.

Figure 3:
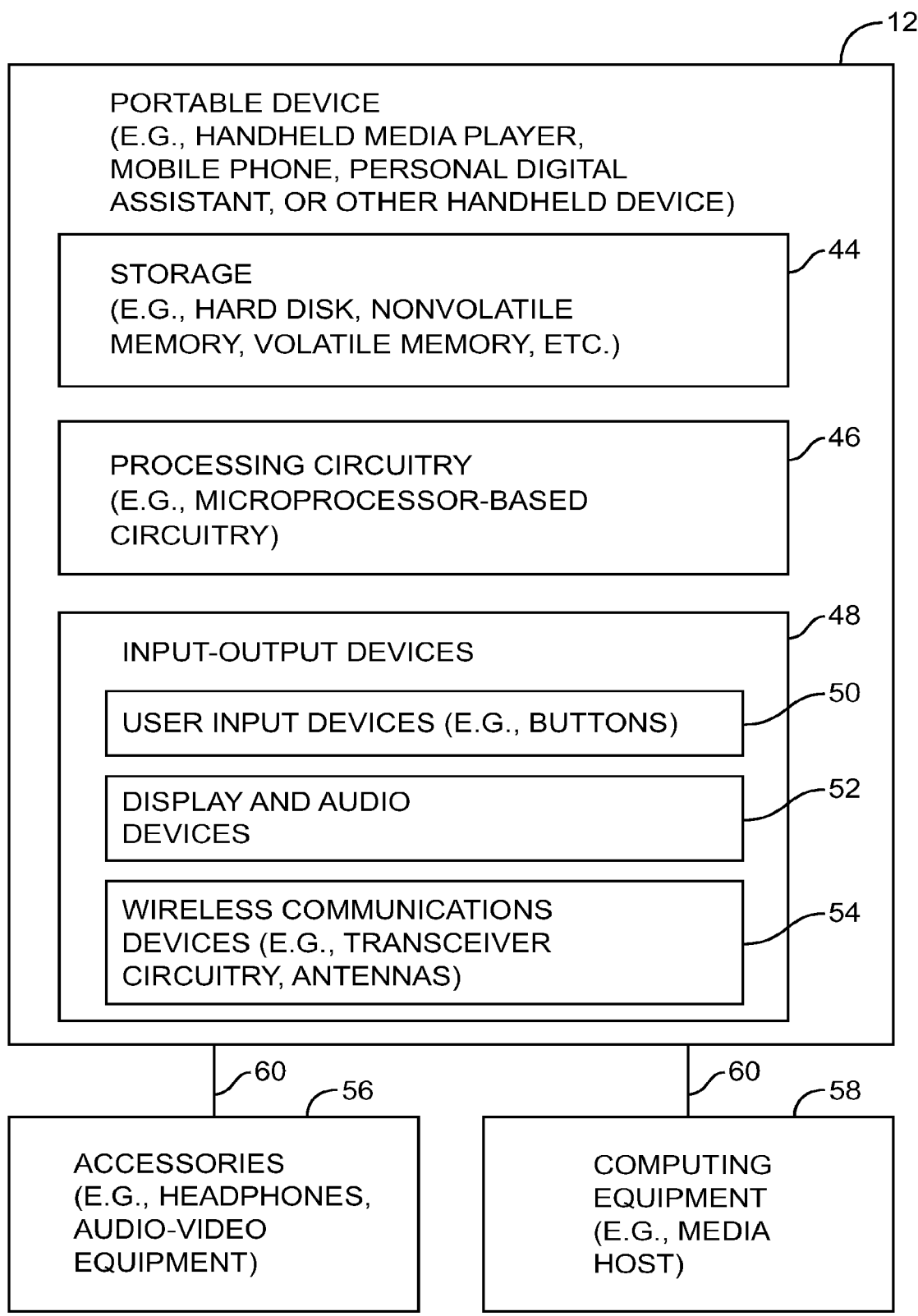
FIG. 3 is a schematic diagram of an illustrative portable electronic device in accordance with an embodiment of the present invention.

A schematic diagram of an embodiment of an illustrative user device 12 is shown in FIG. 3. User device 12 may be a mobile telephone, a mobile telephone with media player capabilities, a media player, a handheld computer, a game player, a global positioning system (GPS) device, a combination of such devices, or any other suitable electronic device such as a portable device.

As shown in FIG. 3, user device 12 may include storage 44. Storage 44 may include one or more different types of storage such as hard disk drive storage, nonvolatile memory (e.g., flash memory or other electrically-programmable-read-only memory), volatile memory (e.g., battery-based static or dynamic random-access-memory), etc. Storage 44 may be used to store voice commands and contextual information about the state of device 12 when voice commands are received.

Processing circuitry 46 may be used to control the operation of user device 12. Processing circuitry 46 may be based on a processor such as a microprocessor and other suitable integrated circuits. With one suitable arrangement, processing circuitry 46 and storage 44 are used to run software on user device 12, such as speech recognition applications, internet browsing applications, voice-over-internet-protocol (VOIP) telephone call applications, email applications, media playback applications, operating system functions (e.g., operating system functions supporting speech recognition capabilities), etc. Processing circuitry 46 and storage 44 may be used in implementing analog-to-digital conversion functions for capturing audio and may be used to implement speech recognition functions.

Input-output devices 48 may be used to allow data to be supplied to user device 12 and to allow data to be provided from user device 12 to external devices. Display screen 34, button 37, microphone port 42, speaker port 40, speaker port 41, and dock connector port 38 are examples of input-output devices 48.

Input-output devices 48 can include user input devices 50 such as buttons, touch screens, joysticks, click wheels, scrolling wheels, touch pads, key pads, keyboards, microphones, cameras, etc. A user can control the operation of user device 12 by supplying commands through user input devices 50. Display and audio devices 52 may include liquid-crystal display (LCD) screens or other screens, light-emitting diodes (LEDs), and other components that present visual information and status data. Display and audio devices 52 may also include audio equipment such as speakers and other devices for creating sound. Display and audio devices 52 may contain audio-video interface equipment such as jacks and other connectors for external headphones, microphones, and monitors.

Wireless communications devices 54 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications circuitry in circuitry 54).

User device 12 can communicate with external devices such as accessories 56 and computing equipment 58, as shown by paths 60. Paths 60 may include wired and wireless paths (e.g., bidirectional wireless paths). Accessories 56 may include headphones (e.g., a wireless cellular headset or audio headphones) and audio-video equipment (e.g., wireless speakers, a game controller, or other equipment that receives and plays audio and video content).

Computing equipment 58 may be any suitable computer such as computing equipment 14 or computing equipment 18 of FIG. 1. With one suitable arrangement, computing equipment 58 is a computer that has an associated wireless access point (router) or an internal or external wireless card that establishes a wireless connection with user device 12. The computer may be a server (e.g., an internet server), a local area network computer with or without internet access, a user's own personal computer, a peer device (e.g., another user device 12), or any other suitable computing equipment. Computing equipment 58 may be associated with one or more online services. A link such as link 60 may be used to connect device 12 to computing equipment such as computing equipment 14 of FIG. 1.

Wireless communications devices 54 may be used to support local and remote wireless links. Examples of local wireless links include infrared communications, Wi-Fi® (IEEE 802.11), Bluetooth®, and wireless universal serial bus (USB) links.

If desired, wireless communications devices 54 may include circuitry for communicating over remote communications links. Typical remote link communications frequency bands include the cellular telephone bands at 850 MHz, 900 MHz, 1800 MHz, and 1900 MHz, the global positioning system (GPS) band at 1575 MHz, and data service bands such as the 3G data communications band at 2170 MHz band (commonly referred to as UMTS or Universal Mobile Telecommunications System). In these illustrative remote communications links, data is transmitted over links 60 that are one or more miles long, whereas in short-range links 60, a wireless signal is typically used to convey data over tens or hundreds of feet.

Figure 4:
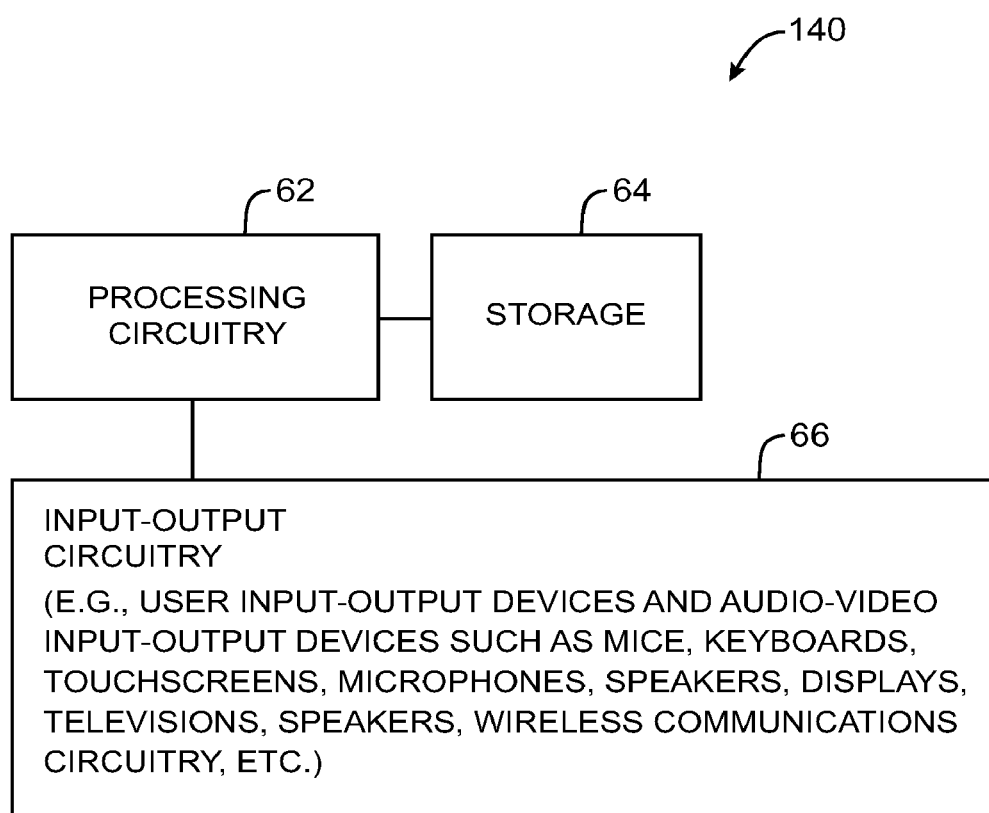
FIG. 4 is a schematic diagram of illustrative computing equipment that may be used in processing voice commands from a portable electronic device in accordance with an embodiment of the present invention.

A schematic diagram of an embodiment of illustrative computing equipment 140 is shown in FIG. 4. Computing equipment 140 may include any suitable computing equipment such as a personal desktop computer, a laptop computer, a server, etc. and may be used to implement computing equipment 14 and/or computing equipment 18 of FIG. 1. Computing equipment 140 may be a server (e.g., an internet server), a local area network computer with or without internet access, a user's own personal computer, a peer device (e.g., another user device 12), other suitable computing equipment, or combinations of multiple pieces of such computing equipment. Computing equipment 140 may be associated with one or more services such as services 18 of FIG. 1.

As shown in FIG. 4, computing equipment 140 may include storage 64 such as hard disk drive storage, nonvolatile memory, volatile memory, etc. Processing circuitry 62 may be used to control the operation of computing equipment 140. Processing circuitry 62 may be based on one or more processors such as microprocessors, microcontrollers, digital signal processors, application specific integrated circuits, and other suitable integrated circuits. Processing circuitry 62 and storage 64 may be used to run software on computing equipment 140 such as speech recognition applications, operating system functions, audio capture applications, other applications with voice recognition and/or audio capture functionality, and other software applications.

Input-output circuitry 66 may be used to gather user input and other input data and to allow data to be provided from computing equipment 140 to external devices. Input-output circuitry 66 can include devices such as mice, keyboards, touch screens, microphones, speakers, displays, televisions, speakers, wired communications circuitry, and wireless communications circuitry.

Figure 5:
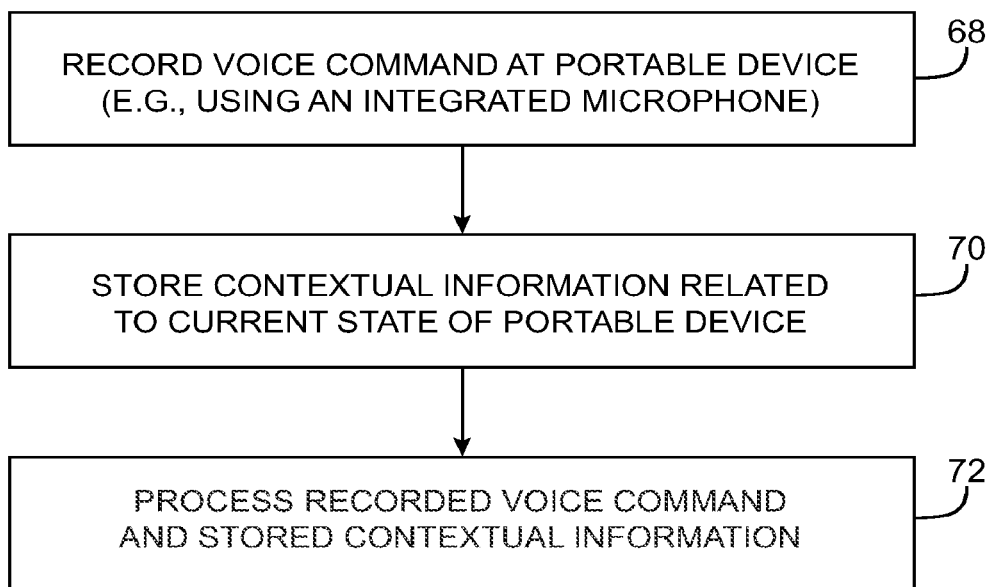
FIG. 5 is a flowchart of illustrative steps involved in using a portable electronic device to receive and process voice commands in accordance with an embodiment of the present invention.

Illustrative steps involved in using an electronic device such as user device 12 to gather voice commands and contextual information are shown in FIG. 5.

At step 68, an electronic device such as user device 12 of FIG. 1 may receive a voice command. Voice commands may be received from a user using an integrated microphone such as a microphone in microphone port 42. If desired, voice commands may be received using an external microphone (e.g., a microphone in an accessory such as a wired or wireless headset).

Voice commands may be recorded (e.g., stored) in storage such as storage 44 of FIG. 3. Voice commands may be stored as a digital audio recording (e.g., an MP3 audio clip). With one suitable arrangement, voice commands may be stored in long-term storage (e.g., nonvolatile memory, hard disk drive storage, etc.) so that the voice commands may be processed at a later time. If desired, voice commands may be stored in short-term storage (e.g., volatile memory).

At step 70, user device 12 may store contextual information related to the current state of the user device. The contextual information may include any information that is available about the current state of the user device. For example, the contextual information may include information related to a current media playback operation (e.g., media attributes such as a track name, a title, an artist name, an album name, year, genre, etc.), a current web-browsing operation (e.g., a current web-address), the geographic location of the user device (e.g., a location determined using a location sensor, a location derived from information associated with communications path 20 and 21 such as which cellular telephone network or other network the device is connected to, or location data manually entered by a user), the current date and time, a telephone operation (e.g., a telephone number or contact information associated with a current or previous telephone call), information from other software applications running on device 12 such as mapping applications, business productivity applications, email applications, calendar applications, calendar applications, games, etc. The contextual information may include contextual information related to operations occurring in the background of the operation of device 12. For example, contextual information may include media playback information in addition to web browsing information when user device 12 is being used to browse the Internet while listening to music in the background.

With one suitable arrangement, user device 12 may store voice commands as audio clips without performing local voice recognition operations. If desired, user device 12 may perform a speech recognition operation on a voice command. The results of this operation may be used to convert the command into a code or may be used to determine which contextual information is most relevant. Device 12 may then store this most relevant contextual information. For example, user device 12 may perform a preliminary speech recognition operation to search for specific keywords such as "music," "location," "near," and other suitable keywords to determine which contextual information would be most relevant. With this type of arrangement, keywords such as "location" and "near" may indicate that location information is relevant while keywords such as "music" may indicate that information associated with a current media playback operation is most likely to be relevant.

A voice command that has been recorded in step 68 may be processed at step 70. User device 12 may process the voice command using a speech recognition engine. When user device 12 processes the voice command, user device 12 may also process contextual information stored in step 70. With one suitable arrangement, user device 12 may process each voice command with a speech recognition application that runs on processing circuitry such as circuitry 46. If the speech recognition application is able to successfully recognize the speech in the voice command, user device 12 may attempt to perform the action or actions requested by the voice command using any relevant contextual information. For example, the voice command "find more music like this" may be interpreted by user device 12 to mean that the user device should perform a search for music that has the same genre as music that was playing when the voice command was received. User device 12 may therefore perform a search for music using the genre of the currently playing music as a search criteria.

With one suitable arrangement, voice commands may be associated with a list of available media files on user device 12 so that the list of media files serve as contextual information. Image captures and captured audio and/or video clips can also serve as contextual information. For example, user device 12 may have an integrated camera that can be used to take pictures. In this example, user device 12 may allow a user to supply a voice command and to associate the voice command with one or more pictures so that the pictures serve as contextual information. In one example of this type of arrangement, if user device 12 receives the voice command "identify this car" and receives information associating the voice command with a picture containing a car, user device 12 may transmit the picture to a service capable of identifying cars from pictures.

Figure 6:
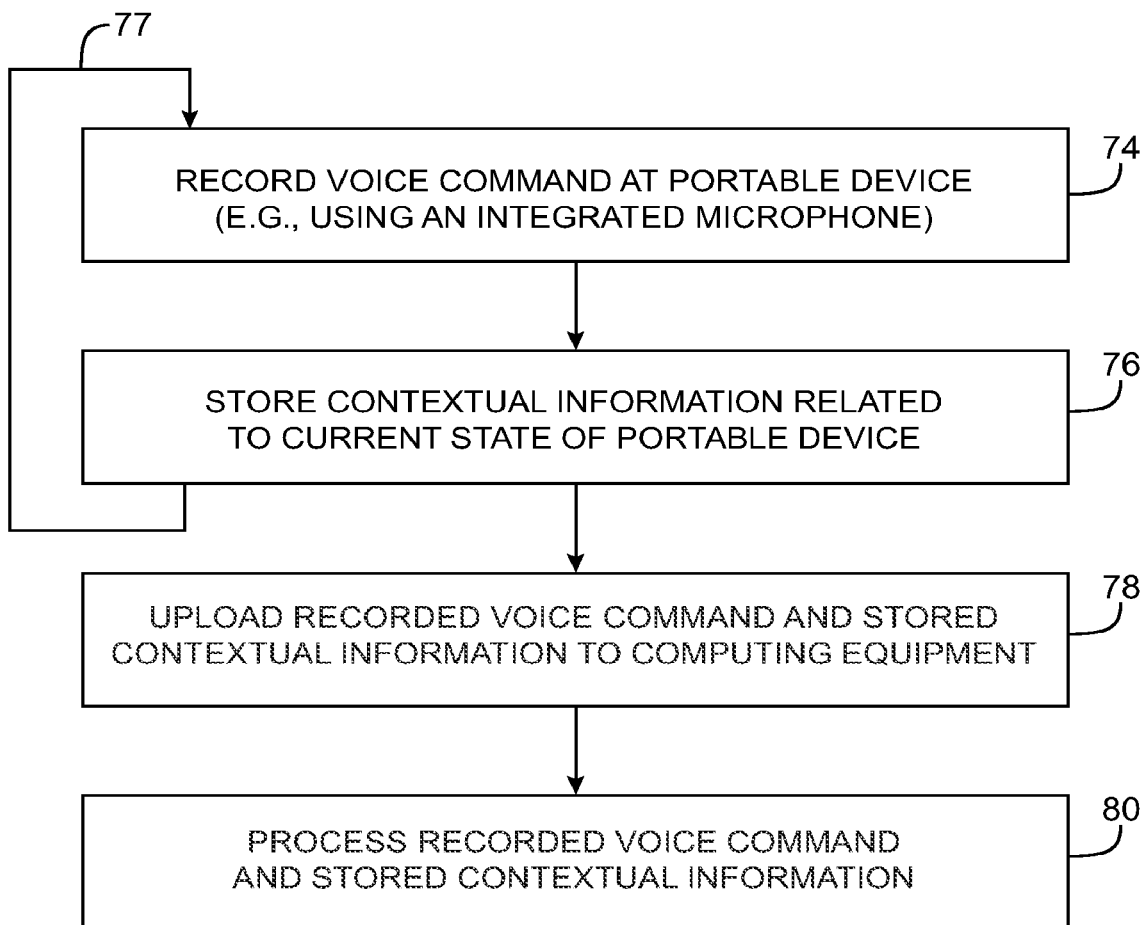
FIG. 6 is a flowchart of illustrative steps involved in using a portable electronic device to receive and upload voice commands and using computing equipment to process the voice commands in accordance with an embodiment of the present invention.

Illustrative steps involved in using a portable electronic device such as user device 12 to receive and upload voice commands and in using computing equipment such as computing equipment 14 to process the uploaded voice commands are shown in FIG. 6.

At step 74, user device 12 may record a voice command. The voice command may be recorded as an audio clip when a user pressed and releases a record button or supplies other user input directing device 12 to capture the voice command. The voice command may be digitized by device 12 and stored in storage associated with user device 12 such as storage 44.

At step 76, user device 12 may store contextual information in storage. If desired, user device 12 may store only the contextual information that is relevant to the captured voice command. As indicated by line 77, the operations of steps 74 and 76 may be repeated (e.g., user device 12 may record numerous voice commands each of which may be associated with corresponding contextual information).

If desired, user device 12 may present the user with an opportunity to record an audio clip that includes both a voice command and contextual information. An example of a possible audio clip that includes both a voice command and contextual information and that could be received by user device 12 is "create new event for Sunday, July 18th: James's Birthday." In this example, the voice command corresponds to the user's desire for user device 12 to create a new calendar event and the relevant contextual information is included in the audio clip (e.g., the date of the new event "Sunday, July 18th" and the title of the new event "James's Birthday").

At step 78, user device 12 may upload recorded voice commands and stored contextual information to computing equipment such as equipment 14 or equipment 18. User device 12 may upload recorded voice commands and stored contextual information to computing equipment 14 or equipment 18 using any suitable communications path. For example, user device 12 may transmit voice commands and contextual information to equipment 14 directly over communications path 20, indirectly through communications network 16 over paths 17 and 21, or may upload them to equipment 18 over network 16.

The operations of step 78 may be performed at any suitable time. For example, user device 12 may upload stored voice commands and contextual information whenever user device 12 is coupled to the computing equipment directly (e.g., through a communications path such as path 20 which may be a Universal Serial Bus® communication path), whenever user device 12 is coupled to computing equipment indirectly (e.g., through communication network 16 and paths 17 and 21), whenever voice commands are recorded at step 74 and a communications link to the computing equipment is available, on demand (e.g., when user device 12 receives a command from a user to process voice commands by uploading them to the computing equipment), at regular intervals (e.g., every ten minutes, every half hour, every hour, etc.), and at combinations of these and other suitable times.

At step 80, computing equipment such as computing equipment 14 or 18 may process voice commands and contextual information from user device 12. Computing equipment 14 or 18 may process voice commands using speech recognition software (e.g., speech recognition engines) running on processing circuitry 62 of FIG. 4, as an example. Computing equipment 14 or 18 may utilize contextual information in processing the associated voice command. For example, when a voice command requests that more music be found that is similar to a given media file, computing equipment 14 or 18 may perform a search of music based on information about the given media file. In another example, the voice command "find nearby retail establishments" may be interpreted by user device 12, computing equipment 14, or equipment 18 to mean that a search should be performed for retail establishments that are within a given distance of user device 12. The given distance may be any suitable distance such as a pre-specified distance (e.g., walking distance, one-half mile, one mile, two miles, etc.) and a distance specified as part of the voice command. The voice command may also specify which types of retail establishments the search should include. For example, the voice command "find Italian restaurants within three blocks" specifies a type of retail establishment (restaurants), a particular style of restaurant (Italian), and the given distance over which the search should be performed (within three blocks of the geographical location of the user device that received the voice command).

If desired, computing equipment 14 or 18 may fulfill a voice command directly. For example, when user device 12 is connected to computing equipment 14 or 18 (e.g., when device 12 is synched with the equipment), the computing equipment may display results related to the voice command (e.g., a list of similar music) and may perform any appropriate action (e.g., transmit a picture to a car-identification service and then display any results returned by the car-identification service).

With another suitable arrangement, computing equipment 14 or 18 may transmit information related to processing and responding to the voice command to user device 12. In response, user device 12 may then respond to the voice command. This type of arrangement may be particularly beneficial when user device 12 and the computing equipment are not physically located near each other (e.g., when user device 12 is only connected to computing equipment 14 or 18 through long-range communications paths such as through a communications network such as the Internet).

Figure 7:
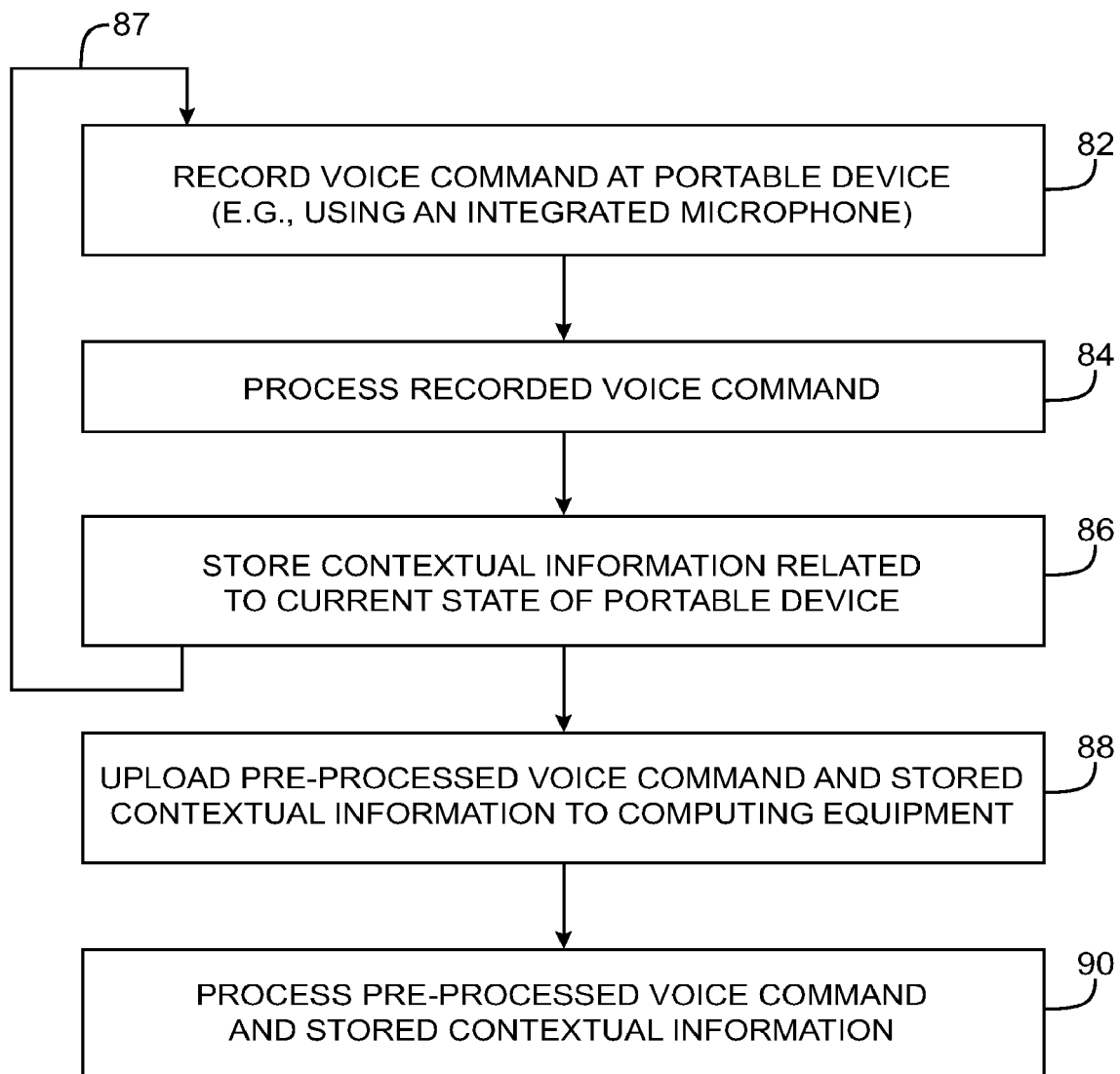
FIG. 7 is a flowchart of illustrative steps involved in using a portable electronic device to receive, process, and upload voice commands and using computing equipment to process the voice commands in accordance with an embodiment of the present invention.

Illustrative steps involved in using a portable electronic device such as user device 12 to receive, process, and upload voice commands and in using computing equipment such as computing equipment 14 or 18 to process the voice commands are shown in FIG. 7.

At step 82, user device 12 may record a voice command. The voice command may be stored in storage such as storage 44.

Following step 82, user device 12 may process the recorded voice command at step 84. User device 12 may process the voice command at any suitable time (e.g., as the voice command is received or at any later time). If desired, user device 12 may perform a preliminary speech recognition operation to determine which portions of the available contextual information are relevant to the voice command. Device 12 may search for specific keywords in the voice command to determine which portions of the available contextual information are relevant, as an example. With another suitable arrangement, device 12 may perform a more thorough speech recognition operation. In this type of arrangement, device 12 may determine that it is able to respond to the voice command immediately (e.g., by executing an operation or by retrieving appropriate information from an appropriate service 18).

If desired, user device 12 may be trained to one or more users' voices. For example, user device 12 may instruct each user to speak a specific set of sample words in order to train its speech recognition operations to be as accurate as possible for each particular user.

When device 12 is not able to fulfill the voice command at the time the voice command is received, device 12 may store contextual information related to the state of user device 12 at the time the voice command was received in storage (step 86).

As illustrated by line 87, the operations of steps 82, 84, and 86 may optionally be repeated as user device 12 receives numerous voice commands that it is not able to fulfill (e.g., respond to) without further processing by computing equipment 14 or 18.

At step 88, user device 12 may upload one or more voice commands and contextual information associated with each of the voice commands to computing equipment 14 or 18. User device 12 may upload the voice commands to computing equipment 14 or 18 at any suitable time.

At step 90, computing equipment 14 or 18 may process voice commands received from user device 12. Computing equipment 14 or 18 may utilize the contextual information associated with each voice command in processing each of the voice commands (e.g., in using a speech recognition engine to process each voice command and associated contextual information).

If desired, computing equipment 14 or 18 may be trained to one or more users' voices. For example, computing equipment 14 or 18 may instruct each user to speak a specific set of sample words in order to train its speech recognition operations to be as accurate as possible for each particular user. With one suitable arrangement, computing equipment 14 or 18 and user device 12 may share information related to training speech recognition operations to particular users.

The voice commands processed and stored by user device 12 and processed by computing equipment 14 or 18 may include any suitable voice commands. With one suitable arrangement, user device 12 and computing equipment 14 or 18 may each have a respective dictionary of voice commands that can be recognized using the speech recognition capabilities of user device 12 and computing equipment 14 or 18. Because computing equipment 14 or 18 may include any type of computing equipment including desktop computers and computer servers which generally have relatively large amount of processing and storage capabilities compared to portable devices such as user device 12, computing equipment 14 or 18 will generally have a larger dictionary of voice commands that the equipment can recognize using speech recognition operations. By uploading voice commands and contextual information from user device 12 to computing equipment 14 or 18, the probability that a given voice command can be successfully processed and fulfilled will generally increase. With one suitable arrangement, user device 12 may have a closed dictionary (e.g., a dictionary containing only specific keywords and phrase) whereas computing equipment 14 or 18 may have an open dictionary (e.g., a dictionary that can include essentially any word or phrase and which may be provided by a service such as one of services 18).

When user device 12 is not connected to communications networks such as network 16 or to computing equipment 14 or 18 over path 20, user device 12 may not always have the capabilities required to satisfy (e.g., fulfill) a particular voice command at the time the voice command is received. For example, if user device 12 is not connected to a communications network and receives a voice command to "find more music like this," user device 12 may be able to determine, using a speech recognition dictionary associated with device 12, that a user wants device 12 to perform a search for music that matches the profile of music currently playing through device 12. However, because user device 12 is not currently connected to a communications network, device 12 may not be able to perform the search immediately. In this situation, device 12 may store the voice command and perform the requested action later at an appropriate time (e.g., when device 12 is connected to computing equipment 14 or 18 or when device 12 connects to a service at equipment 18 through a communications network such as network 16).

Because user device 12 can upload voice commands and contextual information to computing equipment 14 or 18, user device 12 may be able to support an increased amount of voice commands and may be able to respond in a more complete manner than if user device 12 performed speech recognition operations without the assistance of equipment 14 or 18. For example, user device 12 can record voice commands that it is unable to comprehend using its own speech recognition capabilities and can transmit the voice commands and relevant contextual information to computing equipment 14 or 18, which may be more capable and therefore more able to comprehend and respond to the voice commands.

As the foregoing demonstrates, users can capture voice commands on device 12 for immediate processing in a device that includes a speech recognition (voice processing) engine. In the event that no speech recognition processing functions are implemented on device 12 or when it is desired to offload voice recognition functions to remote equipment, device 12 may be used to capture an audio clip that includes a voice command.

Any suitable user interface may be used to initiate voice command recording operations. For example, a dedicated button such as a record button may be pressed to initiate voice command capture operations and may be released to terminate voice command capture operations. The start and end of the voice command may also be initiated using a touch screen and on-screen options. The end of the voice command clip may be determined by the expiration of a timer (e.g., all clips may be three seconds long) or device 12 may terminate recording when the ambient sound level at the microphone drops below a given threshold.

Recorded audio clips may be digitized in device 12 using any suitable circuitry. As an example, device 12 may have a microphone amplifier and associated analog-to-digital converter circuitry that digitizes audio clips. Audio clips may be compressed (e.g., using file formats such as the MP3 format).

Contextual information may be captured concurrently. For example, information may be stored on the current operating state of device 12 when a user initiates a voice command capture operation. Stored contextual information may include information such as information on which applications are running on device 12 and their states, the geographic location of device 12 (e.g., geographic coordinates), the orientation of device 12 (e.g., from an orientation sensor in device 12), information from other sensors in device 12, etc.

Because voice command processing can be deferred until device 12 is connected to appropriate computing equipment, it is not necessary for device 12 to immediately communicate with the computing equipment. As user may, for example, capture voice commands while device 12 is offline (e.g., when a user is in an airplane without network connectivity). Device 12 may also be used to capture voice commands that are to be executed by the user's home computer, even when the user's home computer is not powered.

Later, when device 12 is connected to the user's home computer and/or an online service, the captured voice commands can be uploaded and processed by this external computing equipment. The contextual information that was captured when the voice command was captured may help the external computing equipment (e.g., the user's computer or a remote server) properly process the voice command. The computing equipment to which the voice command is uploaded may be able to access data that was unavailable to device 12 when the command was captured, such as information on the contents of a user's media library or other database, information that is available from an online repository, etc. The computing equipment to which the voice command and contextual information were uploaded may also be able to take actions that are not possible when executing commands locally on device 12. These actions may include actions such as making adjustments to a database on the computing equipment, making online purchases, controlling equipment that is associated with or attached to the computing equipment, etc.

The foregoing is merely illustrative of the principles of this invention and various modifications can be made by those skilled in the art without departing from the scope and spirit of the invention.

What is claimed is:

1. A non-transitory computer-readable storage medium storing one or more programs, the one or more programs comprising instructions, which when executed by a first electronic device, cause the first electronic device to:
   receive a plurality of predefined sample utterances from a first user;
   cause speech recognition operations to be trained on the plurality of predefined sample utterances;
   associate the trained speech recognition operations with the first user; and
   share, with a second electronic device, information related to the trained speech recognition operations associated with the first user, wherein the information is used for processing user utterances received at the second electronic device.

2. The computer-readable storage medium of claim 1, wherein the trained speech recognition operations are user recognition operations.

3. The computer-readable storage medium of claim 1, wherein the trained speech recognition operations are stored as part of a user recognition profile.

4. The computer-readable storage medium of claim 1, wherein a user utterance received at the second electronic device represents a user request.

5. The computer-readable storage medium of claim 4, wherein the instructions, when executed by the first electronic device, further cause the first electronic device to:

process the user utterance using the speech recognition operations;

determine, based on one or more words in the user utterance, contextual information of the first electronic device that is associated with the user request;

based on the user utterance and the contextual information, cause determination of one or more actions responsive to the user request;

cause performance of the one or more actions to generate a result; and present the result.

6. The computer-readable storage medium of claim 4, wherein the result is presented at the second electronic device.

7. The computer-readable storage medium of claim 1, wherein the instructions, when executed by the first electronic device, further cause the first electronic device to instruct the first user to speak the plurality of predefined sample utterances.

8. The computer-readable storage medium of claim 1, wherein a third electronic device instructs the first user to speak the plurality of predefined sample utterances.

9. The computer-readable storage medium of claim 1, wherein the second electronic device instructs the first user to speak the plurality of predefined sample utterances.

10. A method, comprising:
at a first electronic device with one or more processors and memory:
receiving a plurality of predefined sample utterances from a first user;
causing speech recognition operations to be trained on the plurality of predefined sample utterances;
associating the trained speech recognition operations with the first user; and
sharing, with a second electronic device; information related to the trained speech recognition operations associated with the first user, wherein the information is used for processing user utterances received at the second electronic device.

11. The method of claim 10, wherein the trailed speech recognition operations are user recognition operations.

12. The method of claim 10, wherein the trained speech recognition operations are stored as part of a user recognition profile.

13. The method of claim 10, wherein a user utterance received at the second electronic device represents a user request.

14. The method of claim 13, further comprising:
processing the user utterance using the speech recognition operations;
determining, based on one or more words in the user utterance, contextual information of the first electronic device that is associated with the user request;
based on the user utterance and the contextual information; causing determination of one or more actions responsive to the user request;
causing performance of the one or more actions to generate a result; and
presenting the result.

15. The method of claim 14, wherein the result is presented at the second electronic device.

16. The method of claim 10, further comprising:
instructing the first user to speak the plurality of predefined sample utterances.

17. The method of claim 10, wherein a third electronic device instructs the first user to speak the plurality of predefined sample utterances.

18. The method of claim 10, wherein the second electronic device instructs the first user to speak the plurality of predefined sample utterances.

19. A first electronic device, comprising:
a microphone;
one or more processors; and
memory storing one or more programs configured to be executed by the one or more processors, the one or more programs including instructions for:
receiving a plurality of predefined sample utterances from a first user;
causing speech recognition operations to be trained on the plurality of predefined sample utterances;
associating the trained speech recognition operations with the first user; and
sharing, with a second electronic device, information related to the trained speech recognition operations associated with the first user, wherein the information is used for processing user utterances received at the second electronic device.

20. The first electronic device of claim 19, wherein the trained speech recognition operations are user recognition operations.

21. The first electronic device of claim 19, wherein the trained speech recognition operations are stored as part of a user recognition profile.

22. The first electronic device of claim 19, wherein a user utterance received at the second electronic device represents a user request.

23. The first electronic device of claim 22, wherein the one or more programs further include instructions for:
processing the user utterance using the speech recognition operations;
determining, based on one or more words in the user utterance, contextual information of the first electronic device that is associated with the user request;
based on the user utterance and the contextual information, causing determination of one or more actions responsive to the user request;
causing performance of the one or more actions to generate a result; and
presenting the result.

24. The first electronic device of claim 23, wherein the result is presented at the second electronic device.

25. The first electronic device of claim 19, wherein the one or more programs further include instructions for instructing the first user to speak the plurality of predefined sample utterances.

26. The first electronic device of claim 19, wherein a third electronic device instructs the first user to speak the plurality of predefined sample utterances.

27. The first electronic device of claim 18, wherein the second electronic device instructs the first user to speak the plurality of predefined sample utterances.

* * * * *

UNITED STATES PATENT AND TRADEMARK OFFICE
CERTIFICATE OF CORRECTION

| | |
|---|---|
| PATENT NO. | : 11,348,582 B2 |
| APPLICATION NO. | : 16/836226 |
| DATED | : May 31, 2022 |
| INVENTOR(S) | : Aram M. Lindahl |

It is certified that error appears in the above-identified patent and that said Letters Patent is hereby corrected as shown below:

In the Claims

In Column 17, Line 12, Claim 6, delete "claim 4" and insert -- claim 5 --.

In Column 17, Line 35, Claim 10, delete "device;" and insert -- device, --.

In Column 17, Line 40, Claim 11, delete "trailed" and insert -- trained --.

In Column 17, Line 54-55, Claim 14, delete "information;" and insert -- information, --.

In Column 18, Line 58, Claim 27, delete "claim 18" and insert -- claim 19 --.

Signed and Sealed this
Twentieth Day of December, 2022

Katherine Kelly Vidal
*Director of the United States Patent and Trademark Office*